United States Patent
Benacquista et al.

(10) Patent No.: US 11,189,386 B2
(45) Date of Patent: Nov. 30, 2021

(54) REPLACING A THERMAL SLEEVE IN A REACTOR VESSEL HEAD ADAPTER

(71) Applicant: Westinghouse Electric Company LLC, Cranberry Township, PA (US)

(72) Inventors: Eric M. Benacquista, Pittsburgh, PA (US); Anthony J. Mastopietro, Wauwatosa, WI (US); Bryan M. Wilson, Cranberry Township, PA (US); Nicholas A. Szweda, Seven Fields, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 382 days.

(21) Appl. No.: 16/262,037

(22) Filed: Jan. 30, 2019

(65) Prior Publication Data

US 2019/0252082 A1    Aug. 15, 2019

Related U.S. Application Data

(60) Provisional application No. 62/629,339, filed on Feb. 12, 2018.

(51) Int. Cl.
*G21C 13/067*    (2006.01)
*G21C 13/032*    (2006.01)
(Continued)

(52) U.S. Cl.
CPC ......... *G21C 13/032* (2013.01); *G21C 13/067* (2013.01); *G21C 19/00* (2013.01);
(Continued)

(58) Field of Classification Search
CPC .... G21C 13/032; G21C 13/067; G21C 19/00; G21C 19/20; G21C 15/00
(Continued)

(56) References Cited

U.S. PATENT DOCUMENTS 4,714,584 A    12/1987 Altman
5,091,140 A    2/1992 Dixon et al.
(Continued)

FOREIGN PATENT DOCUMENTS

| FR | 2689297 B1 | * | 7/1994 | ........... G21C 13/036 |
| FR | 2701785 B1 | * | 5/1995 | ........... G21C 13/036 |
| JP | 2001-201588 A | | 7/2001 | |

OTHER PUBLICATIONS

International Searching Authority, International Search Report and the Written Opinion for International Application No. PCT/US2019/015797, dated May 17, 2019.

*Primary Examiner* — Jack W Keith
*Assistant Examiner* — Daniel Wasil
(74) *Attorney, Agent, or Firm* — K&L Gates LLP

(57) ABSTRACT

A method of replacing a damaged thermal sleeve in a reactor vessel head adapter that connects a control rod drive mechanism to a reactor vessel head includes the steps of accessing the damaged thermal sleeve, removing the damaged thermal sleeve, and obtaining a replacement thermal sleeve having an elongated tubular body, a flanged region, and a plurality of slots defined in the elongated tubular body, each slot having a width which is sufficient to narrow a maximum outside diameter of the flanged region from a first diameter to a second diameter. The method further includes altering the maximum outside diameter of the flanged region on the replacement thermal sleeve, inserting the replacement thermal sleeve into an opening of a tubular member from an underside of the reactor vessel head, and expanding the maximum outside diameter of the flanged region into a recess of the reactor vessel head adapter.

15 Claims, 22 Drawing Sheets

(51) Int. Cl.
*G21C 19/00* (2006.01)
*G21C 15/00* (2006.01)
*G21C 7/12* (2006.01)
*G21C 15/12* (2006.01)
*G21C 19/20* (2006.01)

(52) U.S. Cl.
CPC ............... *G21C 7/12* (2013.01); *G21C 15/00* (2013.01); *G21C 15/12* (2013.01); *G21C 19/20* (2013.01)

(58) Field of Classification Search
USPC ........................................ 376/204, 287, 292
See application file for complete search history.

(56) References Cited

U.S. PATENT DOCUMENTS

| | | |
|---|---|---|
| 5,297,187 A | 3/1994 | Sodergren et al. |
| 2006/0078080 A1 | 4/2006 | Payne et al. |

* cited by examiner

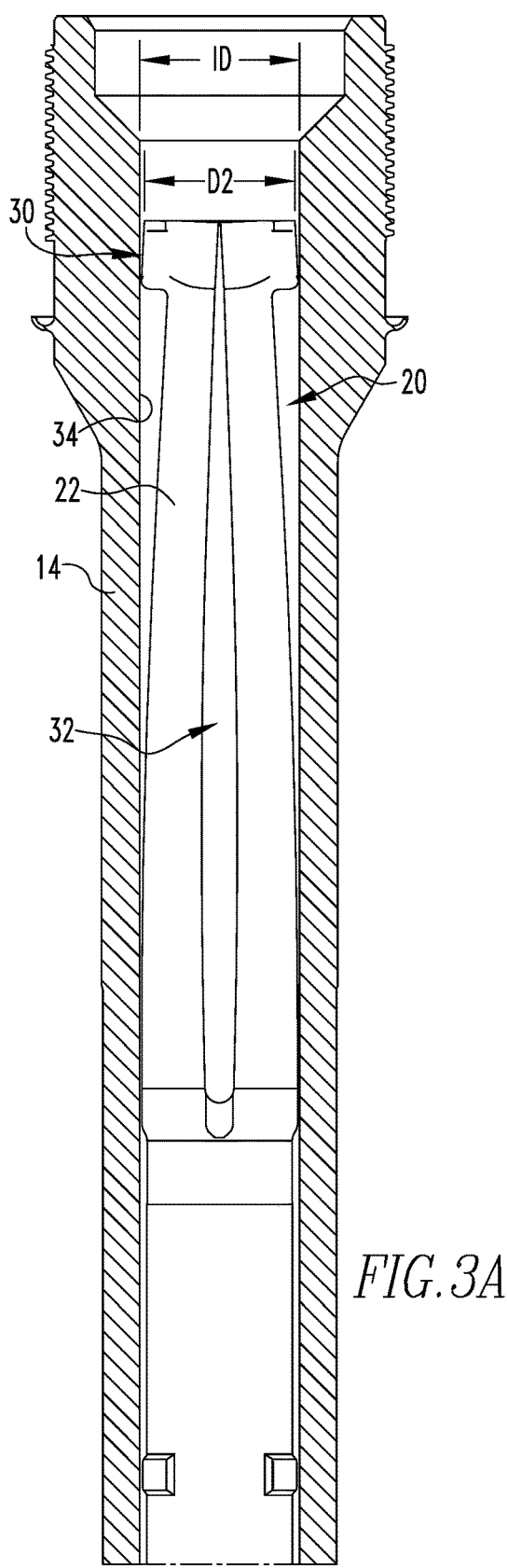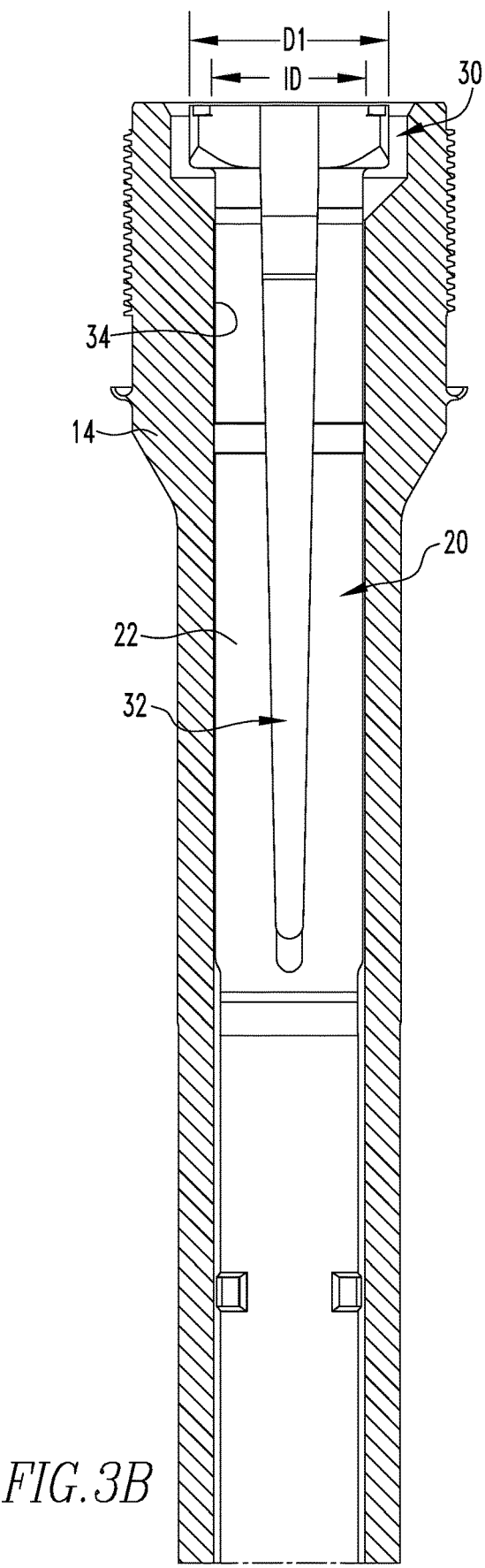
FIG.3A
FIG.3B

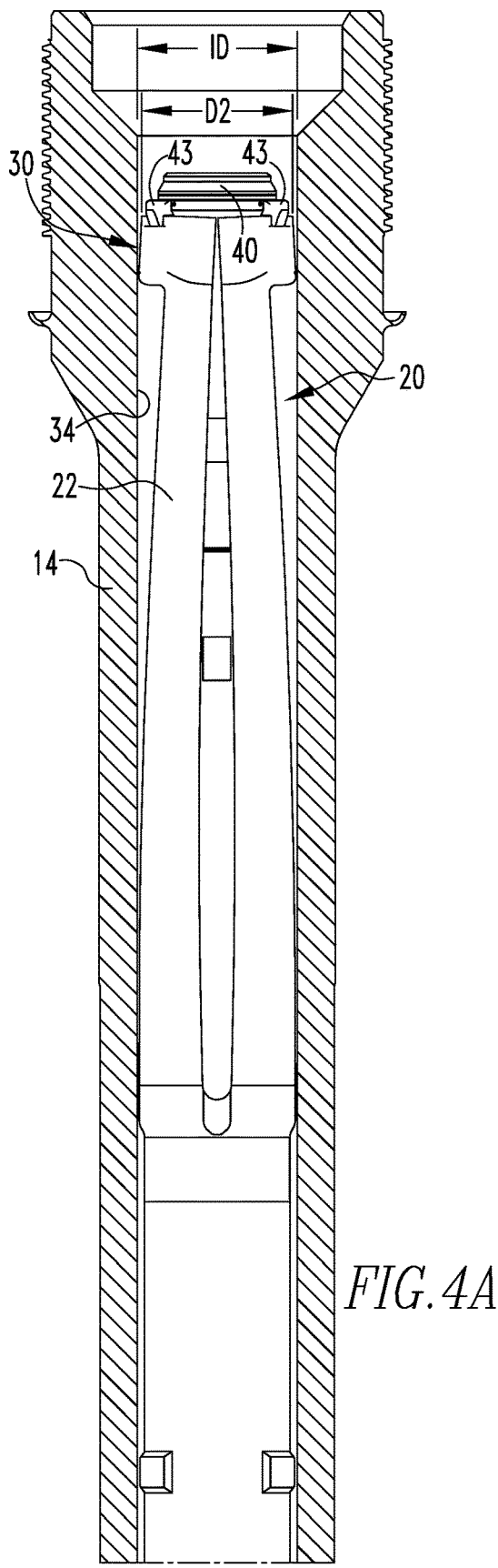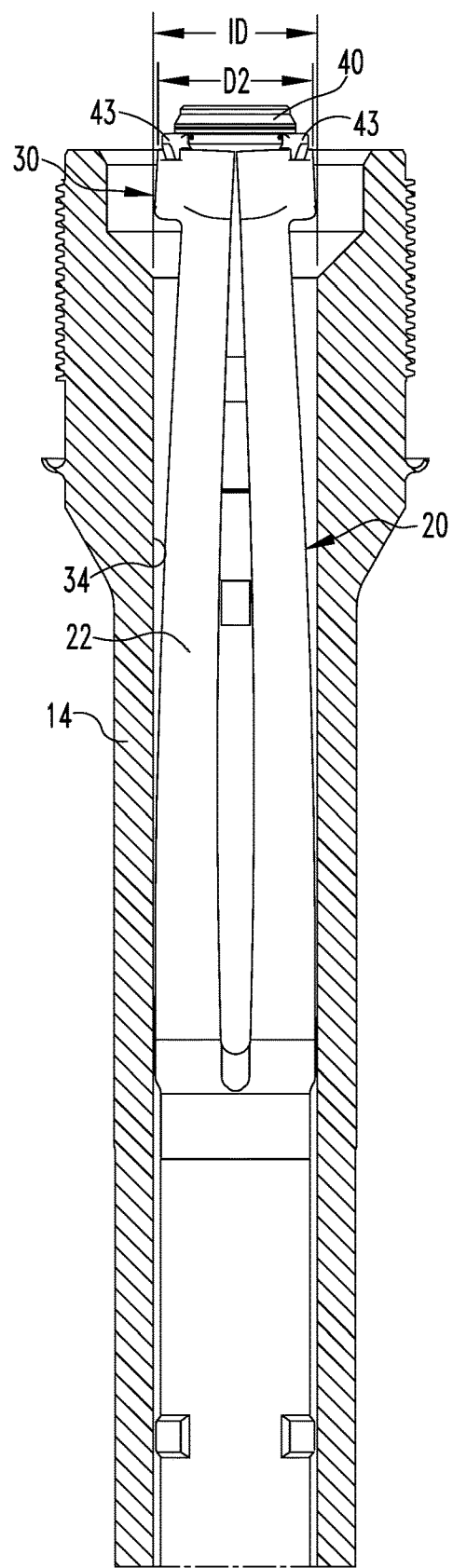
FIG.4A
FIG.4B

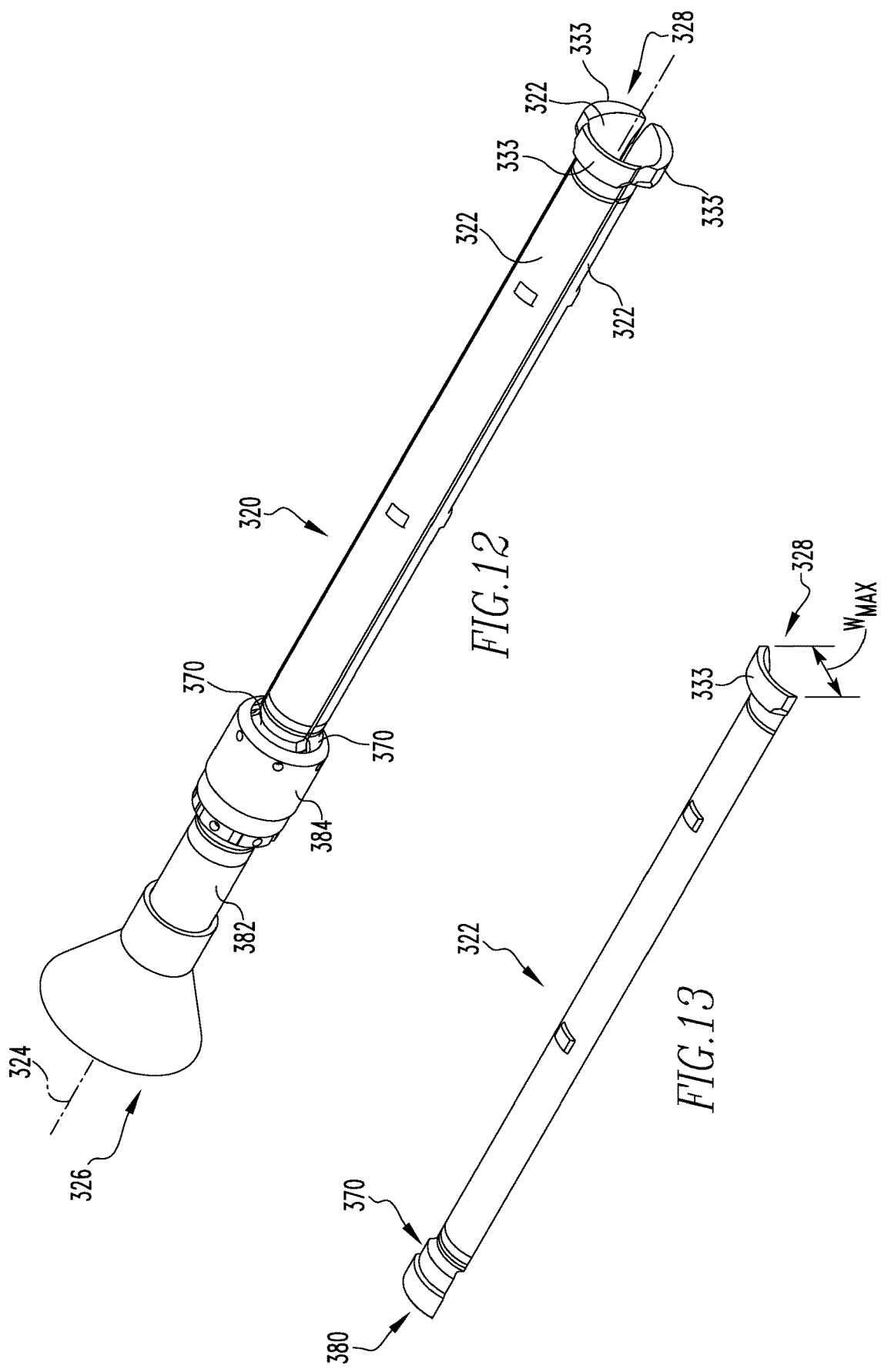

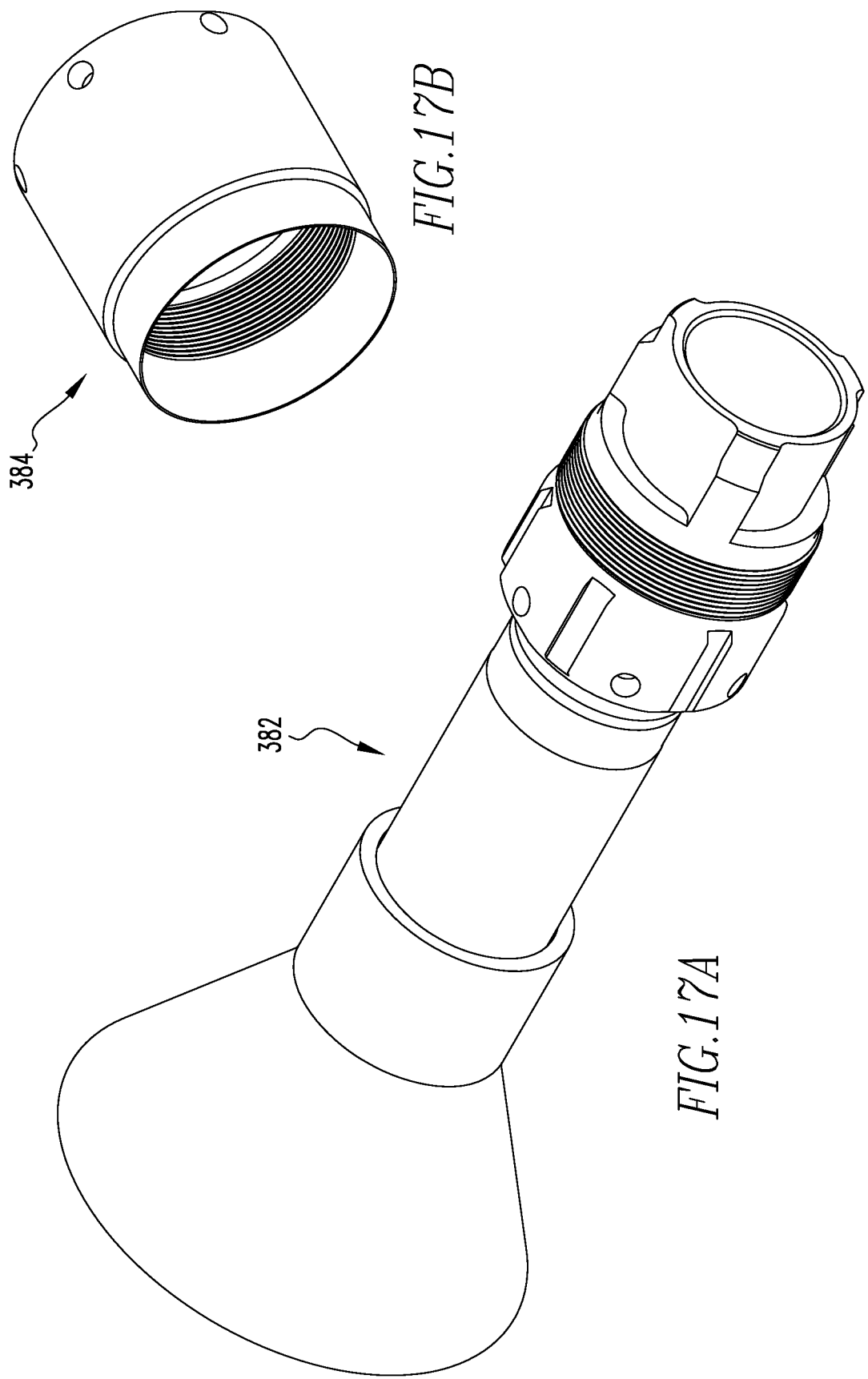

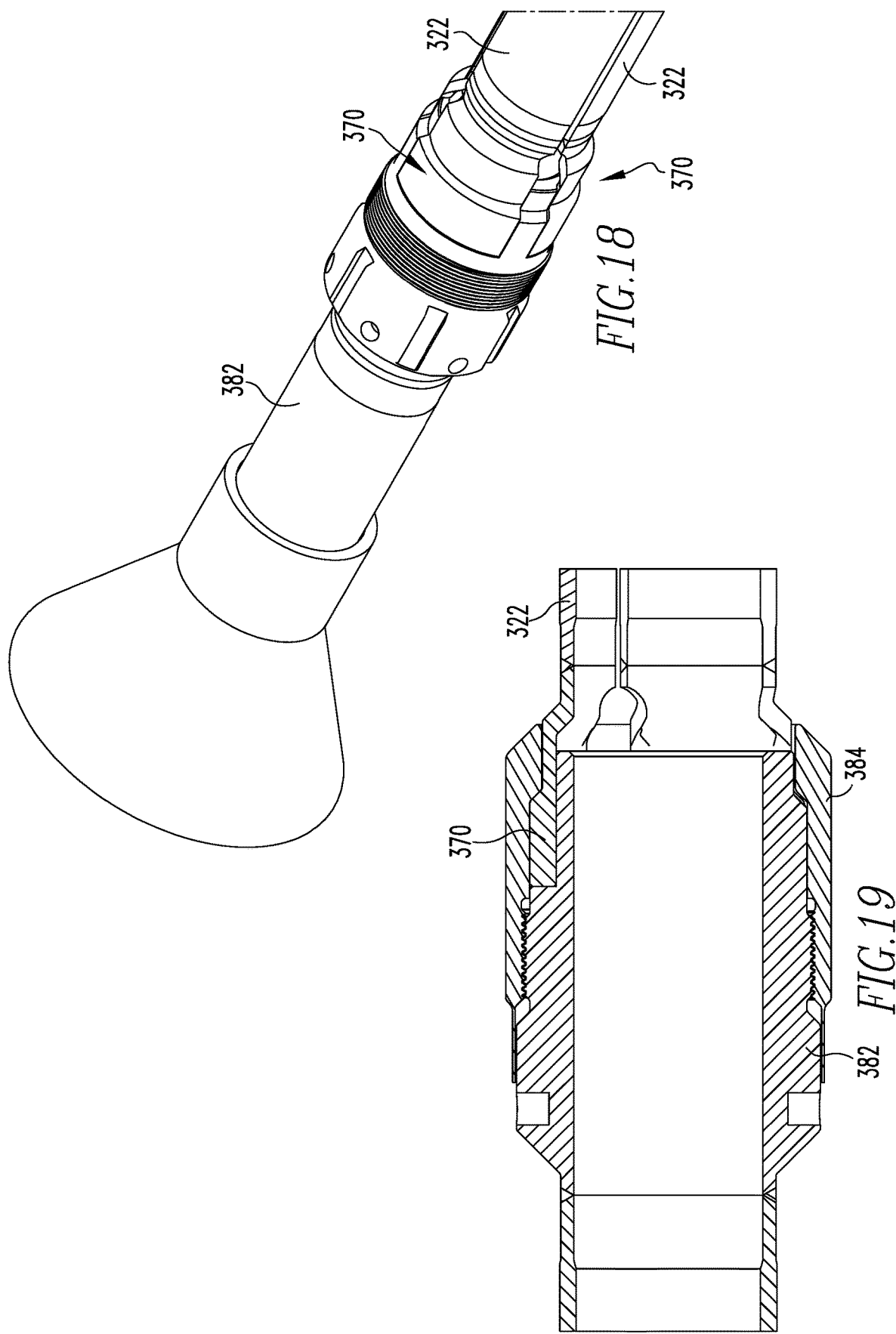

REPLACING A THERMAL SLEEVE IN A REACTOR VESSEL HEAD ADAPTER

CROSS-REFERENCE TO RELATED APPLICATIONS

This patent application claims the priority benefit under 35 U.S.C. § 119(e) of U.S. Provisional Application No. 62/629,339 filed on Feb. 12, 2018, the contents of which are herein incorporated by reference.

FIELD OF THE INVENTION

This invention pertains generally to thermal sleeves and, more particularly, to thermal sleeves that can be relatively easily installed and replaced. This invention also pertains to methods of installing and replacing thermal sleeves.

BACKGROUND OF THE INVENTION

In response to operational experience at a number of nuclear plants there is a clear need for a quickly deployed thermal sleeve replacement for the thermal sleeves in the reactor vessel closure head penetration adapter housing. Thermal sleeve flange wear is a phenomenon first identified domestically in 2014 when a part-length sleeve failed. Since then inspections have been recommended and acceptance criteria have been developed. More recently (December 2017), two additional thermal sleeve failures at rodded locations were identified.

A sectional view of an example arrangement of a conventional thermal sleeve 10 positioned in a guide funnel 12 of a reactor head penetration adaptor 14 within a control rod drive mechanism (CRDM) 16. When a thermal sleeve 10 fails at an upper flange 18 location at a rodded location, the only current repair is the complex removal of the CRDM 16 and reinstallation of a new sleeve 10 and guide funnel 12. This replacement can take several weeks and is required, because the upper flange 18 is integral to the thermal sleeve 10 and fully captured in the head penetration adapter 14.

Accordingly, it is an object of this invention to provide a new thermal sleeve design and method of installation that will reduce the time required for thermal sleeve replacement and avoid the requirement to remove the CRDM.

SUMMARY

This invention achieves the foregoing objective in one embodiment by providing a replacement thermal sleeve comprising an elongated tubular sheath having a wall with a radially, outwardly extending flange at one end of the wall and an axis extending along the elongated dimension. A plurality of slots extend axially in the wall of the elongated tubular sheath with the slots extending through the flange and along the sheath a preselected distance that does not extend to another end of the wall of the sheath. In one such embodiment the slots have a width sufficient to facilitate compression of the flange to narrow an outside diameter of the flange in the compressed state to an extent necessary to clear any obstruction in an opening of a tubular member in which the thermal sleeve is to be inserted. The slots define a flexible leaf between each two adjacent slots. In one embodiment the plurality of slots are two slots formed 180 degrees apart around the circumference of the wall. In one such alternate embodiment the plurality of slots are three slots formed 120 degrees apart around the circumference of the wall. In still another such embodiment, the plurality of slots are four slots formed 90 degrees apart around the circumference of the wall.

In another embodiment, in a relaxed state, at the flange, the leafs substantially touch each adjacent leaf and the leafs are configured so that if spread apart at the flange to a point where the width of the slot is sufficient to seat the flange in a recess in the opening of the tubular member in which the flange is to be seated to lock the replacement thermal sleeve in the opening, then the leafs experience plastic deformation.

The invention also includes a method of replacing a damaged thermal sleeve in a reactor vessel head adapter that connects a control rod drive mechanism to a reactor vessel head. The method includes the step of accessing the damaged thermal sleeve from an underside of the reactor vessel head. The method then removes the damaged thermal sleeve and, in one embodiment, obtains a replacement thermal sleeve. The replacement thermal sleeve has an elongated tubular sheath having a radially, outwardly extending flange at one end; an axis extending along the elongated dimension; and a plurality of axially extending slots in and through the wall of the elongated tubular sheath. The slots extend through the flange and along the sheath a preselected distance that does not extend to another end of the wall of the sheath and have a width sufficient to narrow an outside diameter of the flange to at least an extent necessary to clear any obstruction in an opening of the reactor head adapter in which the thermal sleeve is to be inserted, when adjacent sections of the flange in between the slots substantially touch. The slots define a leaf in between each two adjacent slots. The method then alters the diameter of the flange on the replacement thermal sleeve to an extent necessary to clear any obstruction in the opening in the tubular member that will be encountered while inserting the replacement thermal sleeve to a location within the opening originally occupied by the damaged thermal sleeve; and inserts the replacement thermal sleeve through the opening from the underside of the reactor vessel head. Finally the method expands the diameter of the flange into a recess in the opening in the reactor head adapter.

In one embodiment, the activation of the steps of altering the diameter of the flange, comprises exerting a compressive force to compress adjacent sections of the flange together, and expanding the diameter of the flange, comprises removing the compressive force, and both steps are performed from the underside of the reactor vessel head. In such an embodiment the steps of compressing the flange and releasing the compressed flange is preferably performed by either a tool inserted from the underside of the reactor vessel head that grips recesses in an upper surface of the flange or a retention strap installed below the flange.

In still an alternate embodiment of the method the step of altering the diameter of the flange is performed during manufacture of the replacement thermal sleeve and the step of expanding the diameter of the flange is performed from the underside of the reactor vessel head adapter.

The invention also contemplates a replacement thermal sleeve having a plurality of longitudinal wall sections, with each wall section having a radially outwardly extending flange segment at one end, that when the longitudinal wall sections are fitted together, configure a tubular wall of the replacement thermal sleeve. This latter embodiment of the replacement thermal sleeve also includes a fastener for fastening the plurality of longitudinal wall sections together. One such embodiment for replacing a thermal sleeve in a reactor closure head penetration adapter may configure the longitudinal wall sections to be inserted one at a time into an opening in an underside of the reactor head adapter and the fastener is configured to be applied from an underside of the reactor closure head penetration adapter. The plurality of longitudinal wall sections may also comprise three wall sections.

The invention further contemplates a method for installing the latter embodiment of the replacement thermal sleeve. The method comprises accessing the damaged thermal sleeve from and underside of the reactor vessel head adapter. The damaged thermal sleeve is removed and a replacement thermal sleeve is obtained, with the replacement thermal sleeve divided into a plurality of longitudinal wall sections. The plurality of longitudinal wall sections are inserted into an opening in the underside of the reactor vessel head adapter, one at a time. Then the longitudinal wall sections are arranged within the opening into a tubular housing of the replacement thermal sleeve. The longitudinal wall sections are then fastened together from the underside of the reactor vessel head adapter.

BRIEF DESCRIPTION OF THE DRAWINGS

A further understanding of the invention can be gained from the following description of the preferred embodiments when read in conjunction with the accompanying drawings in which:

FIGS. 3A and 3B are schematic views of the thermal sleeve of FIGS. 2A-2B shown, respectively, in a first, radially compressed, positioning being inserted through a reactor head adaptor (shown sectionally) and in a second, relaxed, positioning installed in the reactor head adaptor;

FIGS. 4A-4E are schematic views of the thermal sleeve of FIGS. 2A-2B (shown sectionally in FIGS. 4C-4E) in various stages of compression and expansion as the thermal sleeve is manipulated by an example compression tool during installation of the thermal sleeve in a reactor head adaptor (shown sectionally);

FIG. 12 is a perspective view of another example thermal sleeve in accordance with another example embodiment of the present invention in which the sleeve is formed from a plurality of leafs;

FIG. 13 is a perspective view of one of the sectioned leafs of the thermal sleeve of FIG. 12;

FIGS. 17A and 17B, respectively, are perspective views of the collar and nut employed to lock the leafs of the thermal sleeve arrangement of FIG. 12 in place within an adapter opening;

FIG. 18 is a perspective view of the segmented leaf tabs in place on the collar of FIG. 17A;

FIG. 19 is a sectional elevation view showing the nut of FIG. 17B fully assembled over the collar and leaf arrangement of FIG. 17A.

DESCRIPTION OF THE PREFERRED EMBODIMENTS

One object of the present invention is to avoid the requirement to remove the CRDM in order to access and remove the thermal sleeve to shorten the time it takes to replace a thermal sleeve in a reactor head adapter. Reducing the time required for a thermal sleeve replacement and providing options on how to do so will be tremendously valuable to the industry as thermal sleeve failures become more prevalent and regular inspections are performed to identify such failures. This invention is a re-design of the thermal sleeve that can be installed without the CRDM removal process. To achieve this, embodiments of the present invention provide for the flange on the lead end of the thermal sleeve to be deformed or disassembled in various ways such that the flange can pass through the narrowest inner diameter of the opening in the reactor head adaptor through which the flange is to be inserted.

Figure 2A:
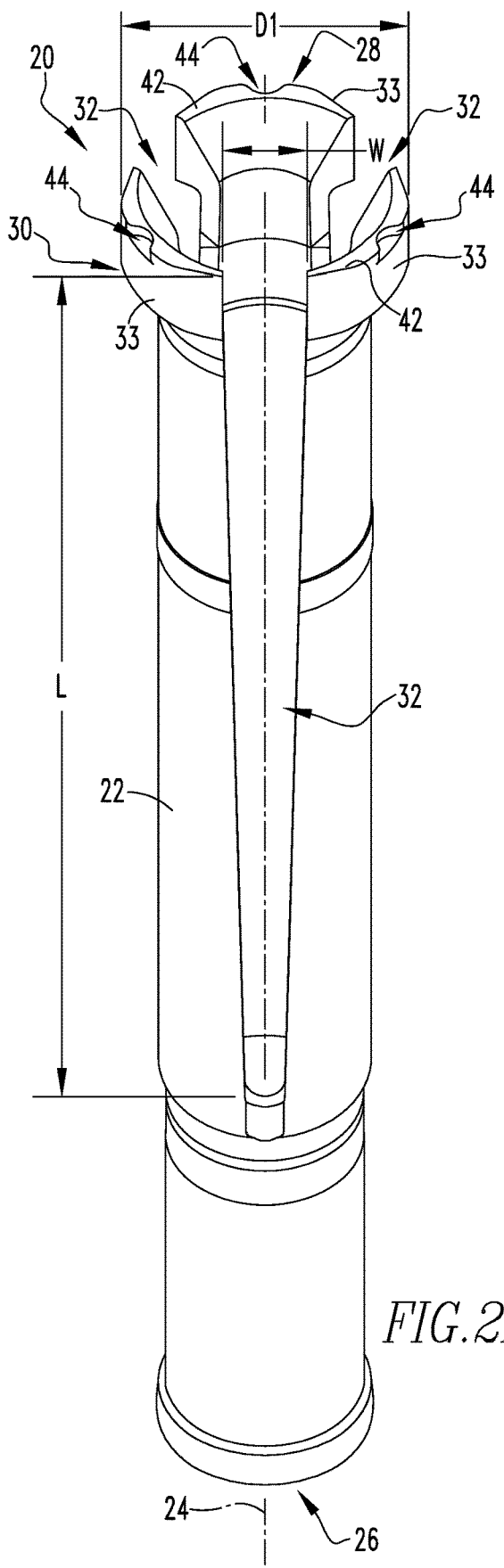
FIGS. 2A and 2B are perspective views of a compressible thermal sleeve in accordance with one example embodiment of the present invention shown, respectively, with a flanged end in a relaxed state and in a radially compressed state.
Figure 2B:
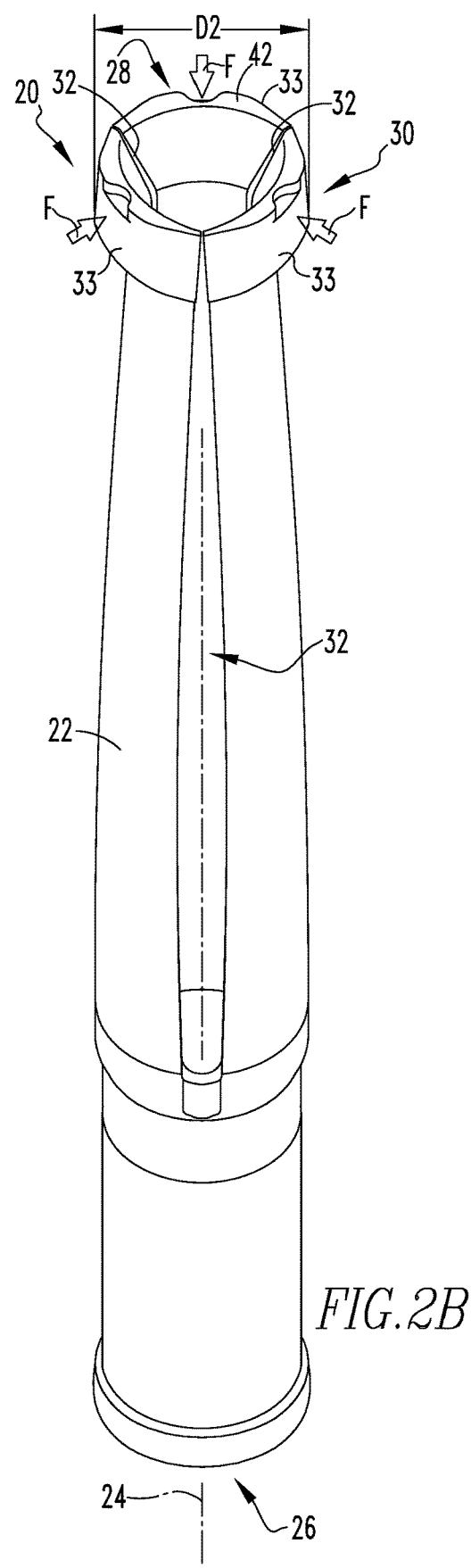

Referring now to FIGS. 2A and 2B, a thermal sleeve 20 in accordance with an example embodiment of the present invention is shown. Thermal sleeve 20 is formed generally as an elongated tubular body 22 disposed about a central longitudinal axis 24 and extending between a bottom end 26 and a top end 28. Thermal sleeve 20 includes a flanged region 30 disposed at or about top end 28 which extends radially outward from tubular body 22 (i.e., away from axis 24). As shown shifting from FIG. 2A to FIG. 2B, flanged region 30 may be deformed inward (i.e., toward axis 24) when a predetermined force F is applied to flanged region 30. To provide for such deformation of flanged region 30, thermal sleeve 20 includes a plurality (three are shown in the illustrated example) of slots 32 defined in tubular body 22, with each slot 32 extending through and from top end 28 toward bottom end 26. As a result of such slots 32, flanged region 30 is thus divided in a plurality of segmented flange lugs 33, with each flange lug 33 being spaced from each adjacent flange lug by a respective slot 32 of the plurality of slots 32. Each slot 32 extends a predetermined distance L along tubular body 22 without extending through bottom end 26 thereof. Additionally, each slot 32 has a maximum width W (generally circumferential to axis 24) which is sufficient to narrow a maximum outside diameter of flanged region 30 from a first diameter D1 (FIG. 2A) to a second diameter D2 (FIG. 2B) in order to clear any obstruction in an opening of a tubular member in which thermal sleeve 20 is to be inserted.

Figure 1:
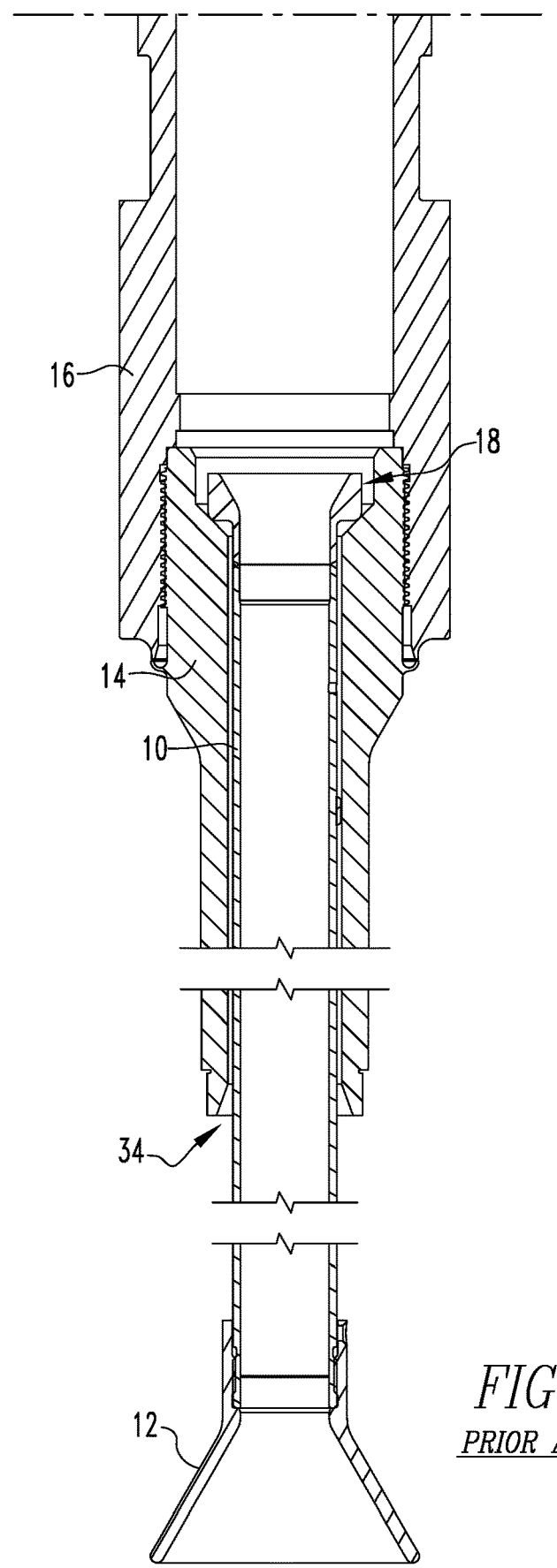
FIG. 1 is a schematic cross-sectional view of a conventional reactor vessel head penetration showing a head adapter, thermal sleeve and Control Rod Drive Mechanism (CRDM) latch housing.

As shown in FIGS. 3A and 3B, such slotted design allows for elastic compression of the slotted portion of tubular body 22, and thus flanged region 30 thereof, such that the resulting outer diameter D2 of flanged region 30 is less than the narrowest inner diameter ID of opening 34 in head penetration adapter 14 (shown in section in FIGS. 3A and 3B, see also FIG. 1) through which thermal sleeve 20 it is to be inserted.

Figure 4E:
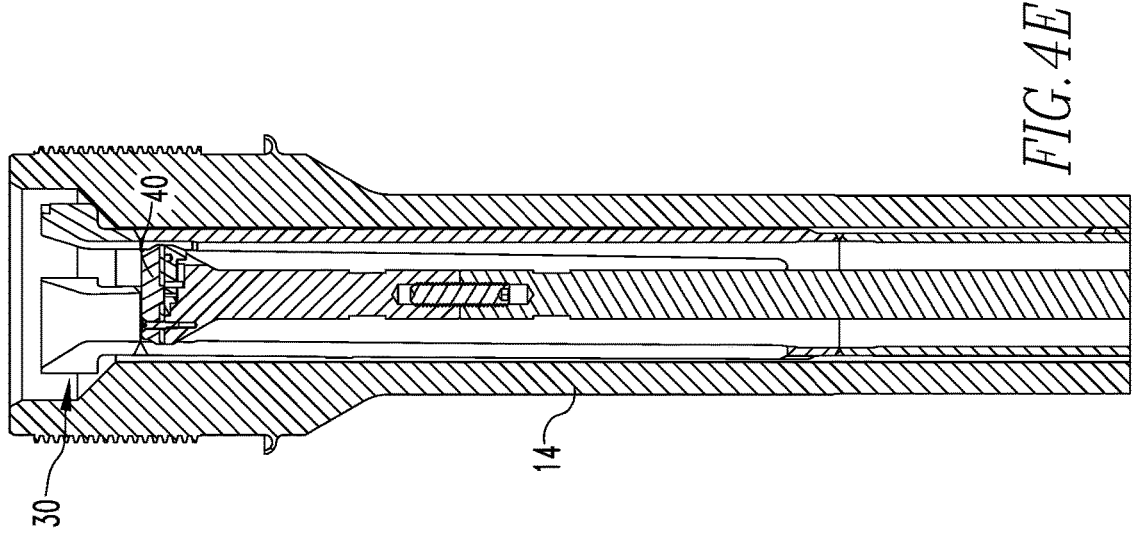
Figure 4D:
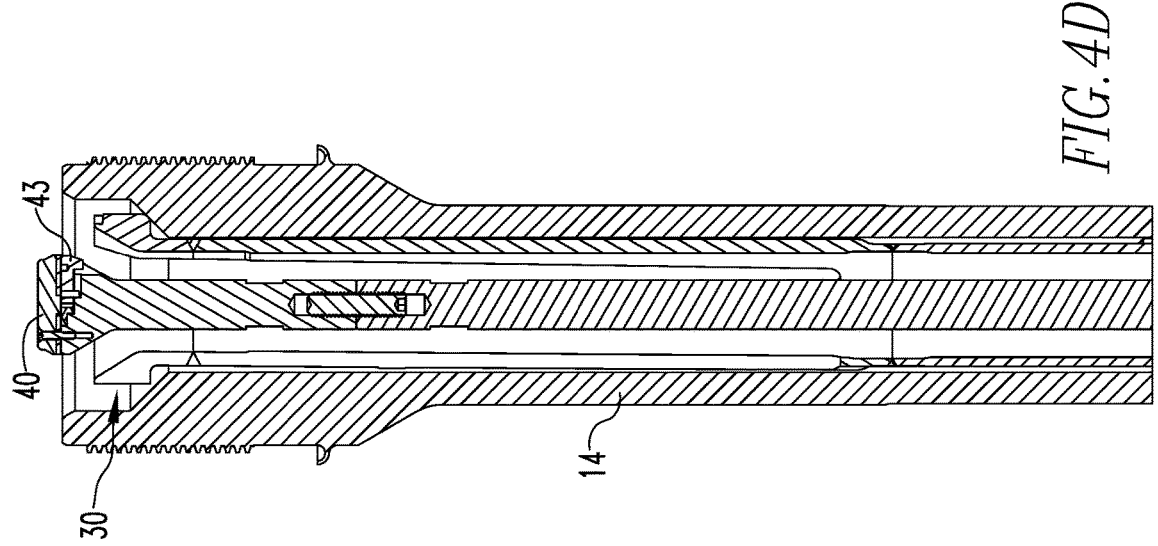
Figure 4C:
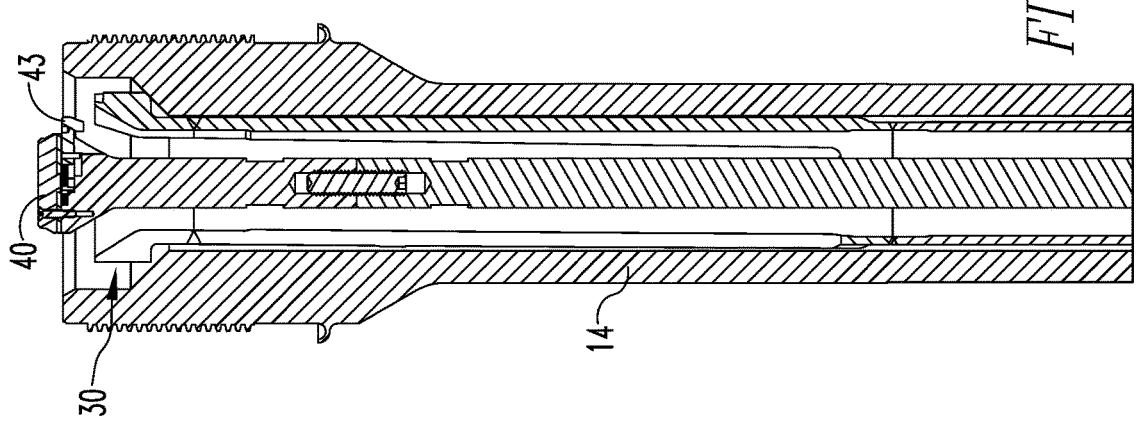

As shown in FIGS. 4A-4E, temporary compression of flanged region 30 of thermal sleeve 20 may be achieved with specialized tooling 40 that interfaces with a top flange face 42 of thermal sleeve 20, e.g., via retractable arms 43 of tooling 40 selectively engaging recesses 44 (FIG. 2A) formed therein or a retention strap stored below the flange (not shown in the figures). Once compressed, replacement sleeve 20 is inserted through the bottom of the head penetration adaptor 14, such as shown in FIG. 4A. Once sleeve 20 is positioned at an installation elevation, tooling 40 releases the compression in a controlled manner and disengages flanged region 30, such as shown in FIGS. 4C and 4D. The tooling 40 is then removed downward through the shaft of head penetration adaptor 14, such as shown in FIG. 4E.

Figure 5:
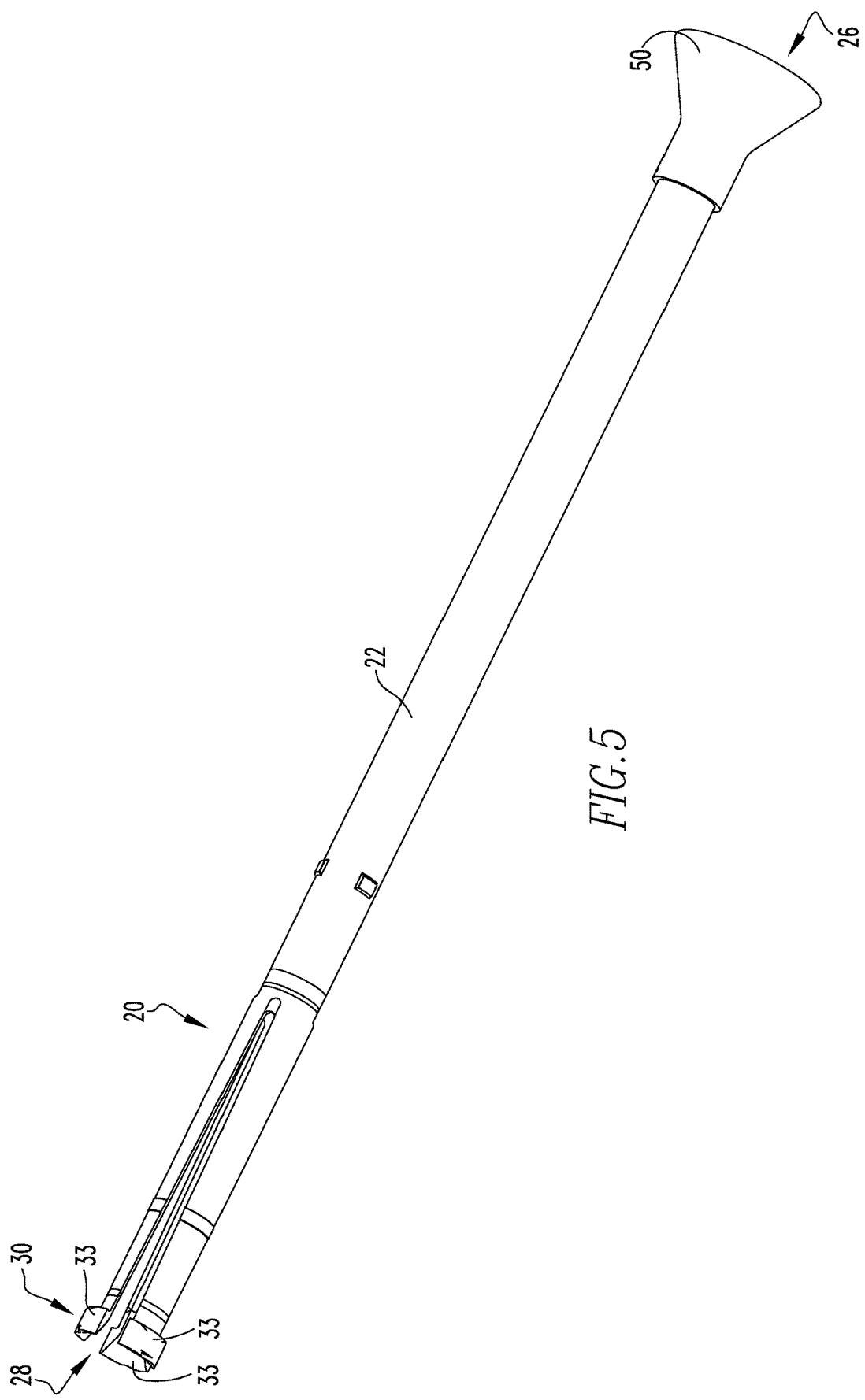
FIGS. 5 and 6 are perspective views of different variations of thermal sleeves in accordance with example embodiments of the present invention.

Referring to FIG. 5, thermal sleeve 20 may be provided as a full-length thermal sleeve. Such embodiment is for use after the entirety of the original thermal sleeve has been completely removed and is installed in the head penetration adaptor 14 in the same manner such as previously discussed. In such embodiment, the bottom end 26 of tubular body 22 may include a funnel 50 to allow guidance of the drive rod into thermal sleeve 20. Funnel 50 may be integral to tubular body 22 or attached separately via any suitable process or arrangement.

Figure 6:
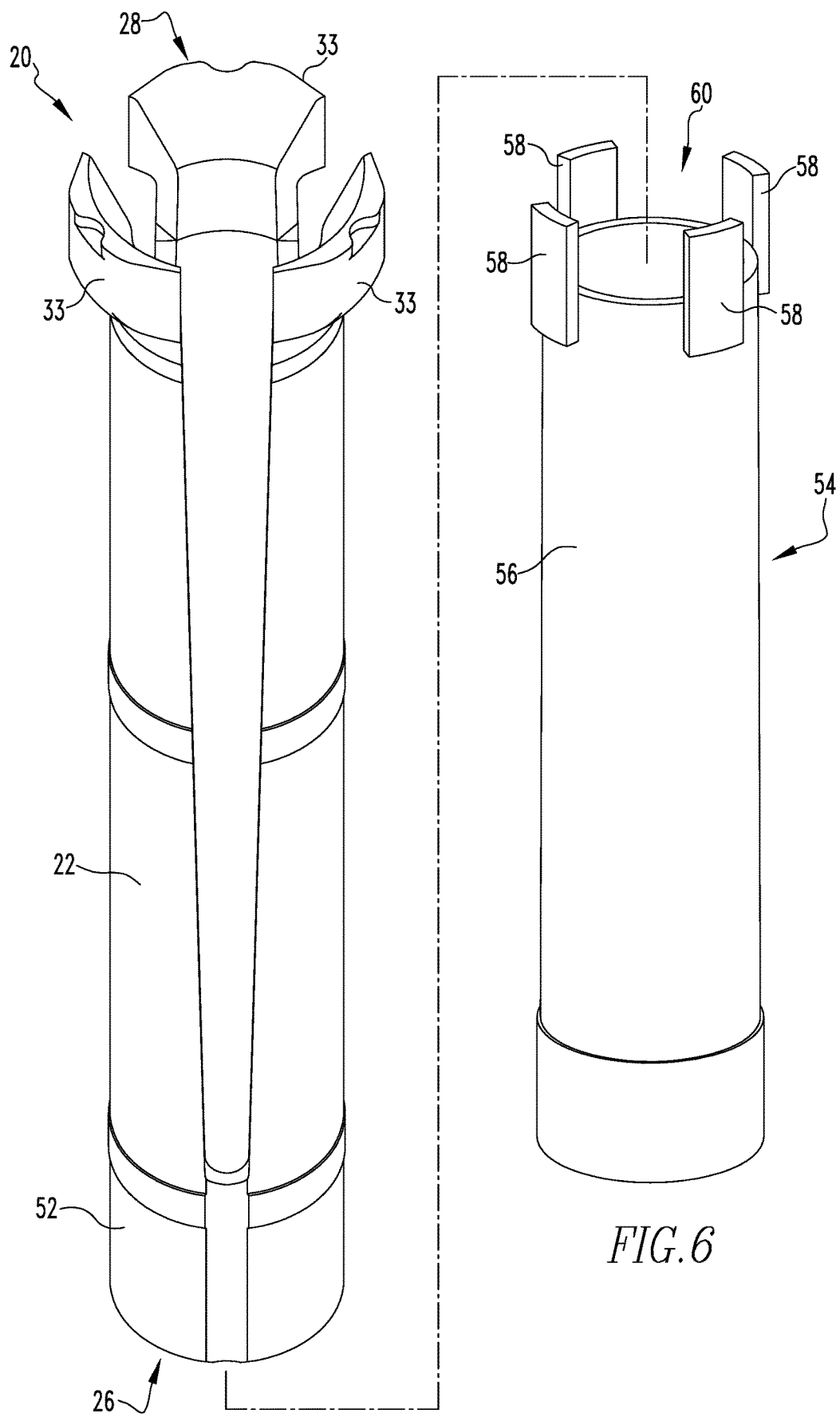
Figure 7:
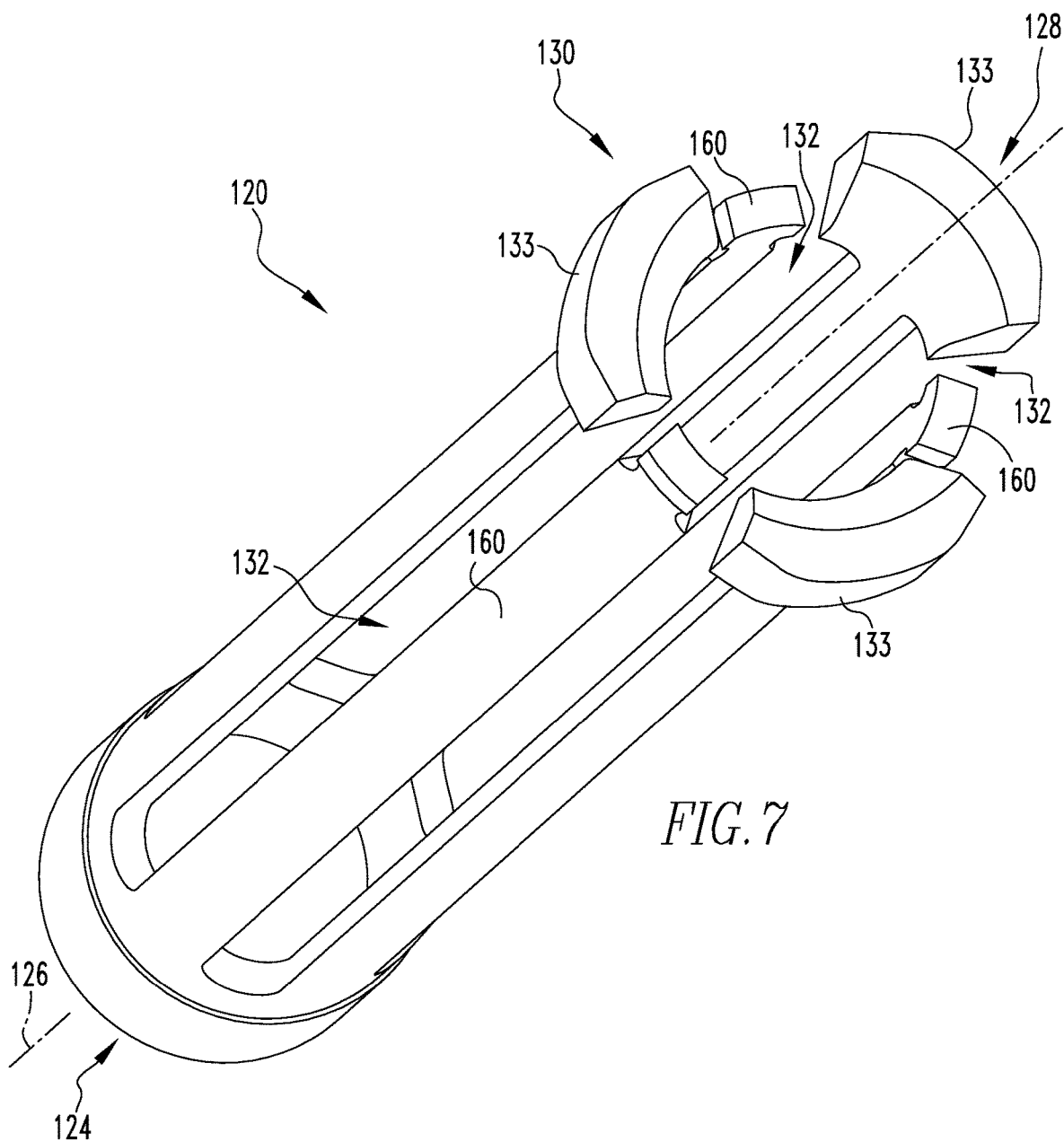
FIG. 7 is a perspective view of another embodiment of a compressible thermal sleeve in accordance with an example embodiment of the present invention with fingers in between the leafs having flange lugs.

Referring to FIG. 6, thermal sleeve 20 may be of a sufficiently short length so as to be fully contained within the head penetration housing 14. In such example, tubular body 22 may include a boss 52 positioned at the bottom end 26 thereof having a greater outer diameter than tubular body 22 in order to assist in centering the thermal sleeve 20 within the head penetration housing 14. The inner diameter of the bottom end 26 of tubular body 22 includes a lead-in chamfer to aid in drive rod insertion thereto. This design can be used with an extension tube attached directly to the bottom of the head penetration housing 14. This embodiment may be used with a guide sleeve adaptor 54 also formed from a tubular body 56. Guide sleeve adaptor 54 includes a plurality of alignment tabs 58 that each extend from a top end 60 thereof and that are positioned so as to align top end 60 of guide sleeve adaptor 54 with bottom end 26 of tubular body 22 of short thermal sleeve 20. Once in place, guide sleeve adaptor 54 solidly attaches to short thermal sleeve 20 and thus generally functions as a guide sleeve.

Figure 8A:
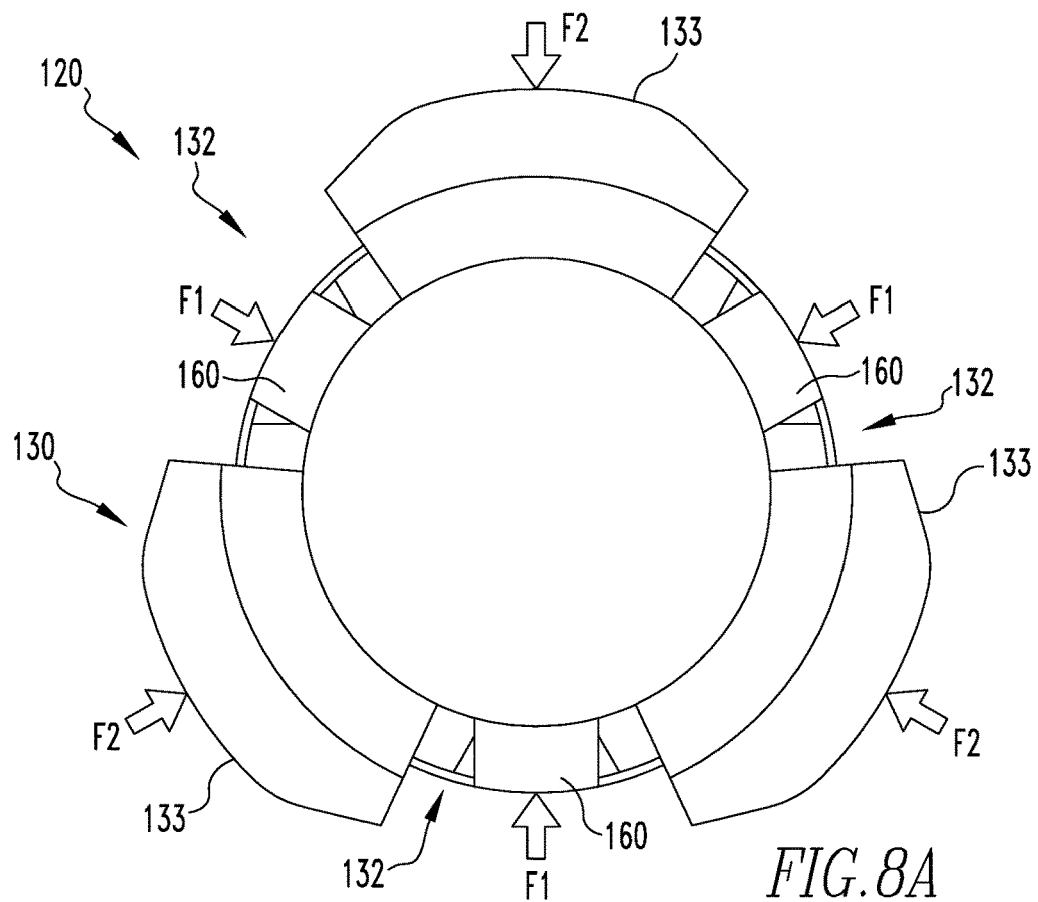
FIG. 8A is an axial view of the thermal sleeve of FIG. 7 in a relaxed configuration.
Figure 8B:
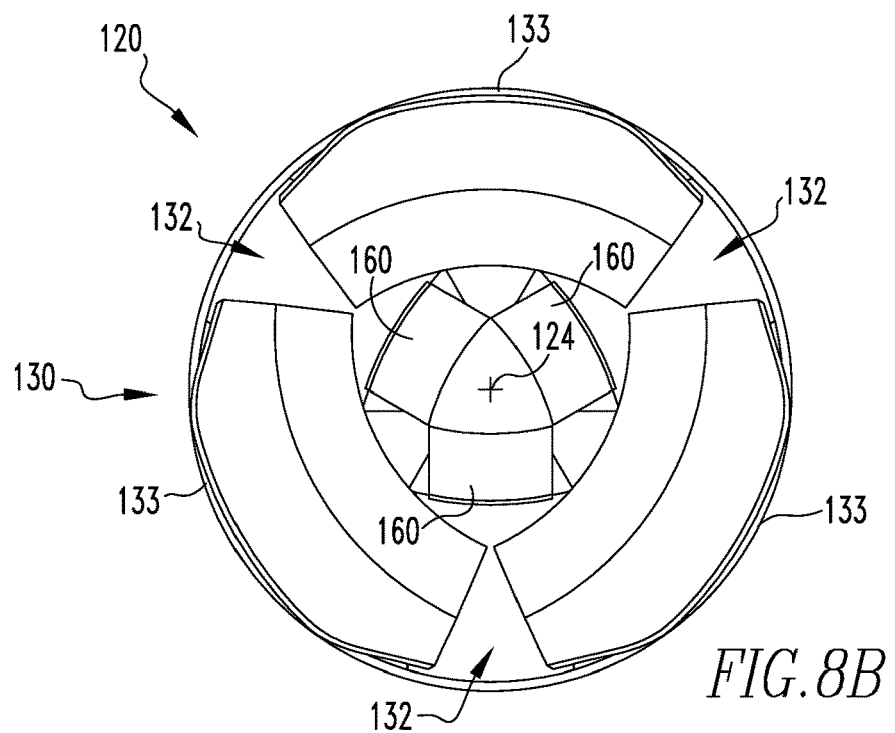
FIG. 8B is a plan view of the thermal sleeve of FIG. 7 with the flange lugs and inserts in a radially compressed, collapsed configuration.
Figure 8C:
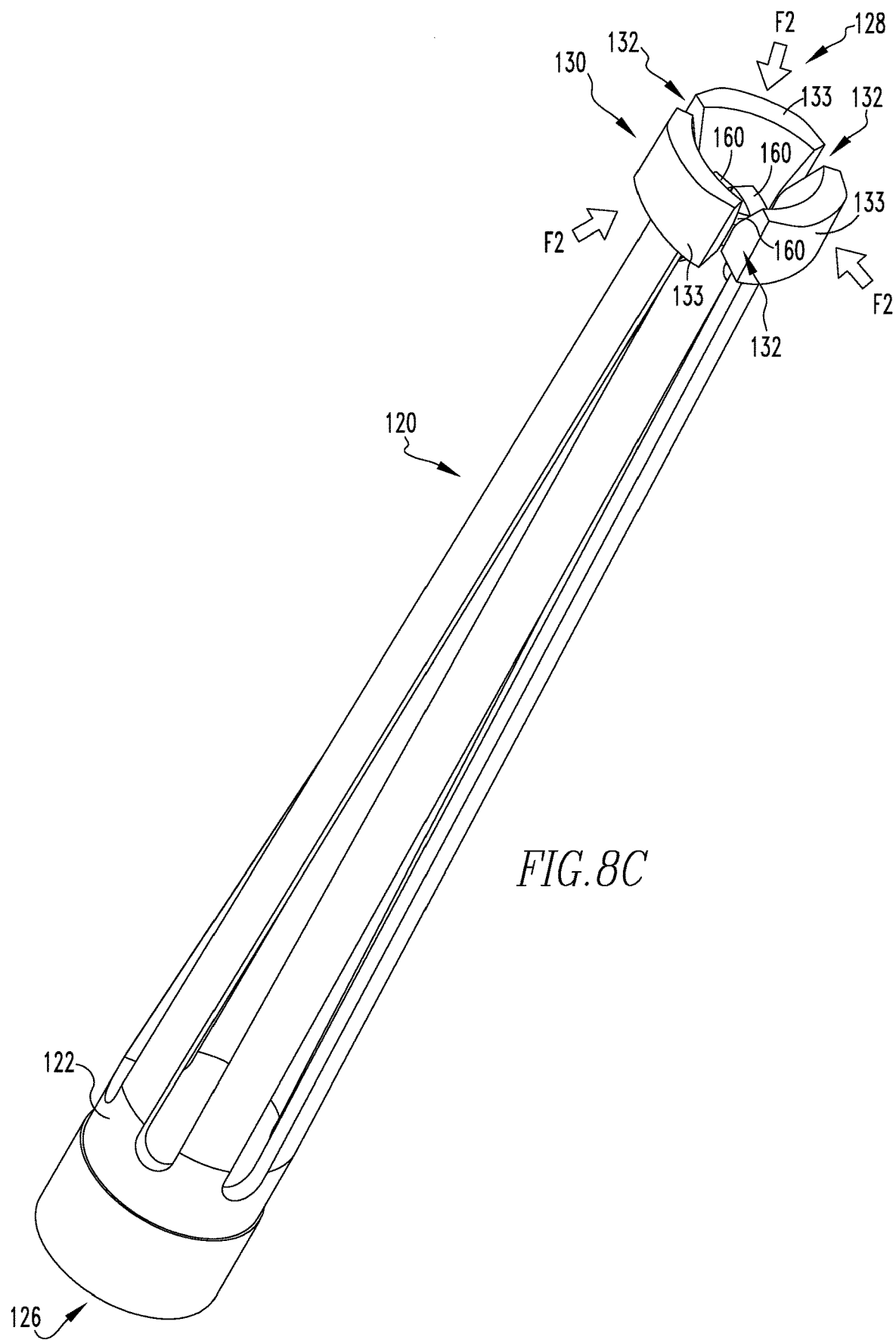
FIG. 8C is a perspective view of the thermal sleeve of FIG. 8B.
Figure 9A:
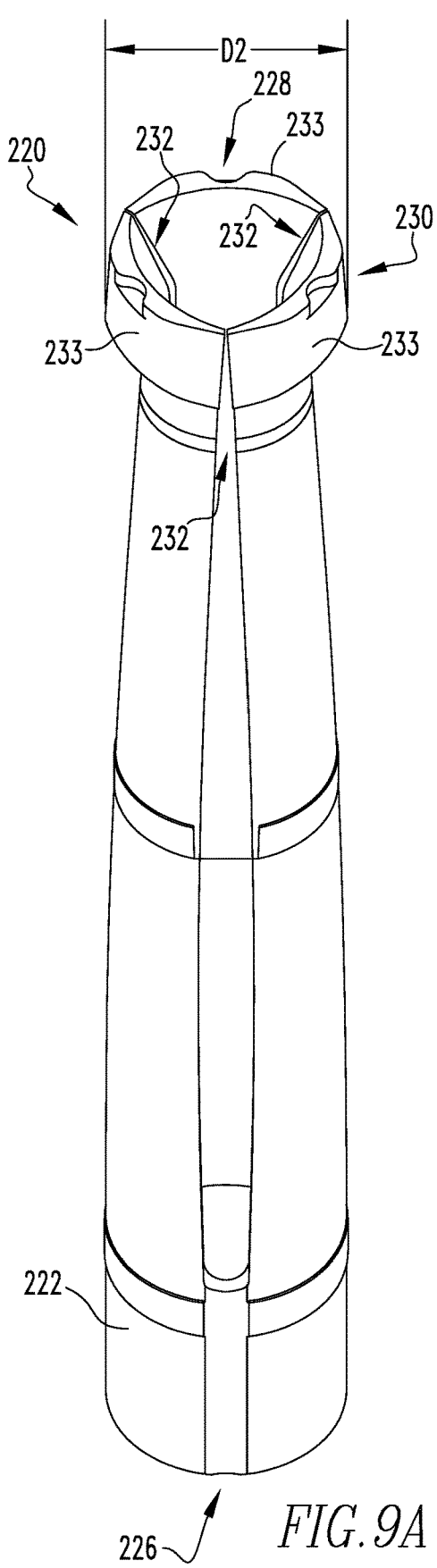
FIGS. 9A and 9B are perspective views of yet another thermal sleeve in accordance with another example embodiment of the present invention shown, respectively, with a flanged end in a first relaxed state and in second relaxed state after plastic deformation of a portion of the thermal sleeve has occurred.
Figure 9B:
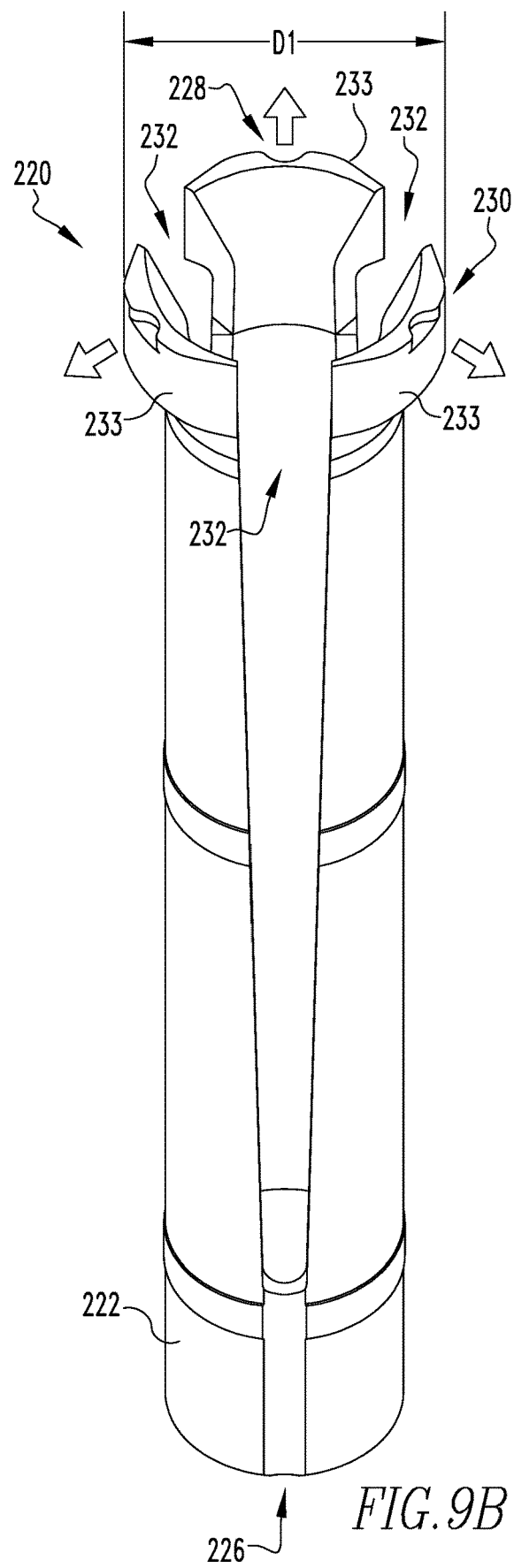
Figure 10A:
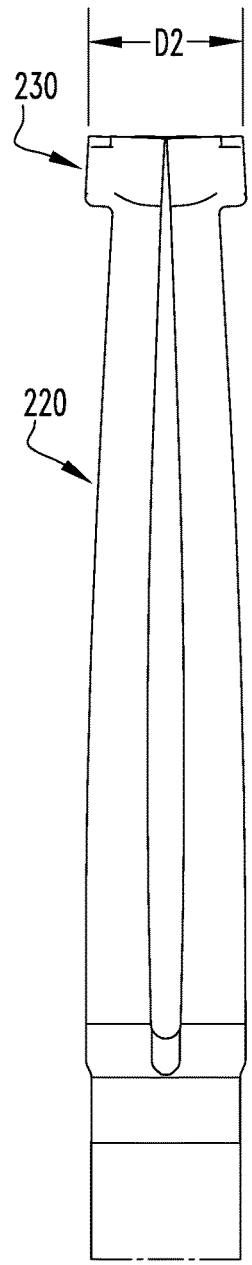
FIGS. 10A-10C are schematic views showing the thermal sleeve of FIGS. 9A-9C in different stages of installation within a reactor head adaptor (shown sectionally)
Figure 10B:
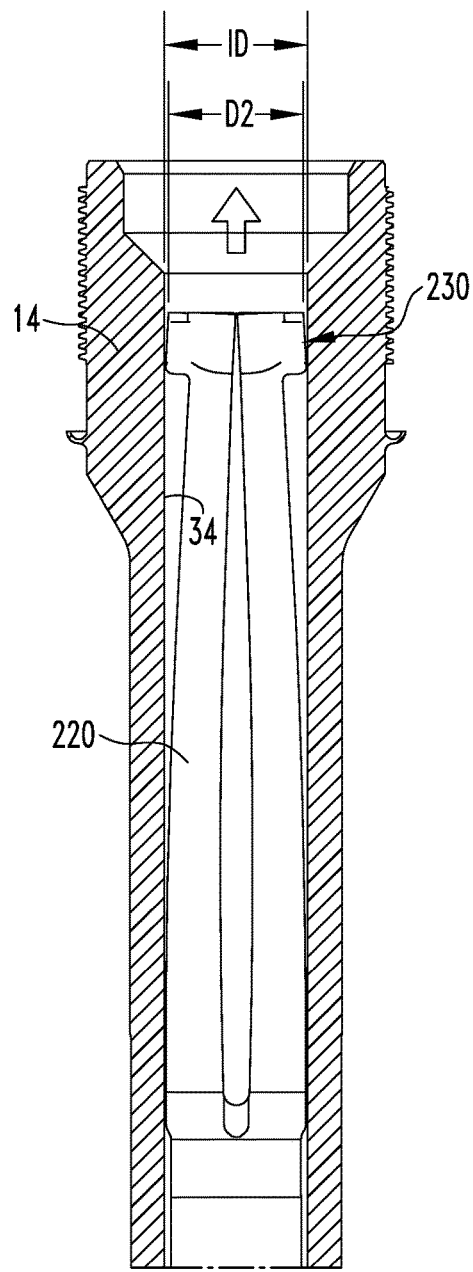
Figure 10C:
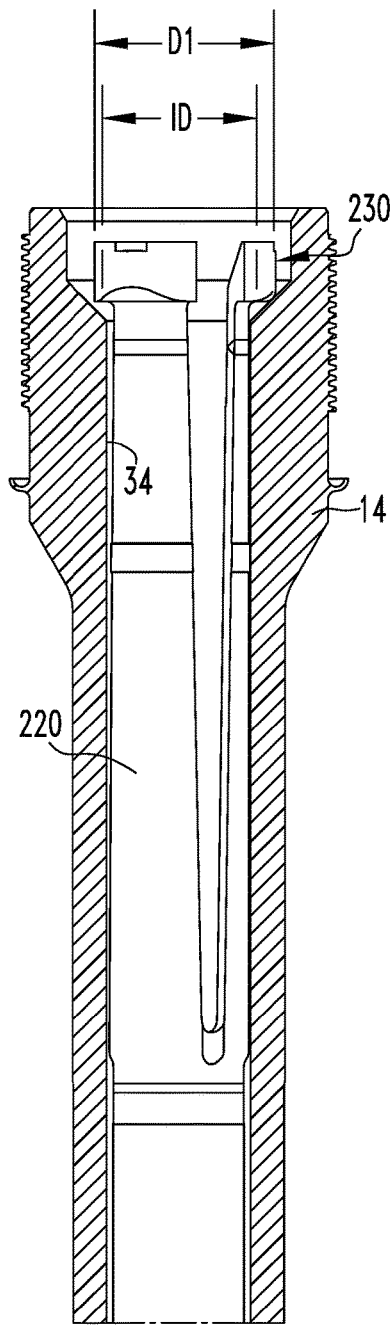

Referring now to FIGS. 7 and 8A-8C, a compressible thermal sleeve 120 in accordance with another example embodiment of the present invention is shown. Thermal sleeve 120 is of generally similar design as thermal sleeve 20 (previously discussed) except thermal sleeve 120 further includes a plurality of inserts 160 which extend generally from bottom end 126 to flanged region 130 at or about top end 128 of tubular body 122 in each of slots 132, such that each slot 132 is generally divided into two by each insert 160. Accordingly, in such arrangement, each insert 160 is disposed circumferentially between a pair of segmented flange lugs 133 in a manner that prevents adjacent flange lugs 133 from moving inward towards axis 124. Radial compression of sleeve 120 after installation is a concern because downward loads on sleeve 120 could cause flanged region 130 thereof to compress radially inward and slide down the penetration and/or contact the control drive rod. Unlike each of flange lugs 133 which are particularly arranged so as to interact with a head penetration adaptor 14 (similar to flange lugs 33 previously discussed), each insert 160 does not extend outward and thus does not interface with head penetration adaptor 14 (and thus are not forced inward when sleeve 120 is pulled downward). Because inserts 160 are not forced to move radially, they will remain circumferentially between, and thus be "pinched" by the flange lugs 133 as flange lugs 133 are pushed radially inward. The interference between flange lugs 133 and inserts 160 prevents lugs 133 from moving inward enough to contact the drive rod or fit into the narrower portion of head penetration adaptor 14. As shown in FIG. 8B, the plurality of inserts 160 are designed to be able to fit within the space (not numbered) of the flange lugs 133 when the sleeve 120 is in the collapsed configuration. Pre-installation manipulation is required to place sleeve 120 in this configuration, so it cannot be achieved during operation. To achieve this configuration for installation into the penetration adapter opening, inserts 160 are first compressed by first forces F1 (FIG. 8A) into the center of the flange opening, as shown in the end view of FIG. 8B and the perspective view of FIG. 8C. Next the flange lugs 133 are compressed by a second force F2 (FIGS. 8A and 8C) until they are substantially touching as shown in the end view of FIG. 8B and the perspective view of FIG. 8C. Inserts 160 spring back into their required position between each of flange lugs 133 in the same manner as the flange lugs 133 when the thermal sleeve 120 is fully inserted in the head penetration adapter 14.

Figure 11A:
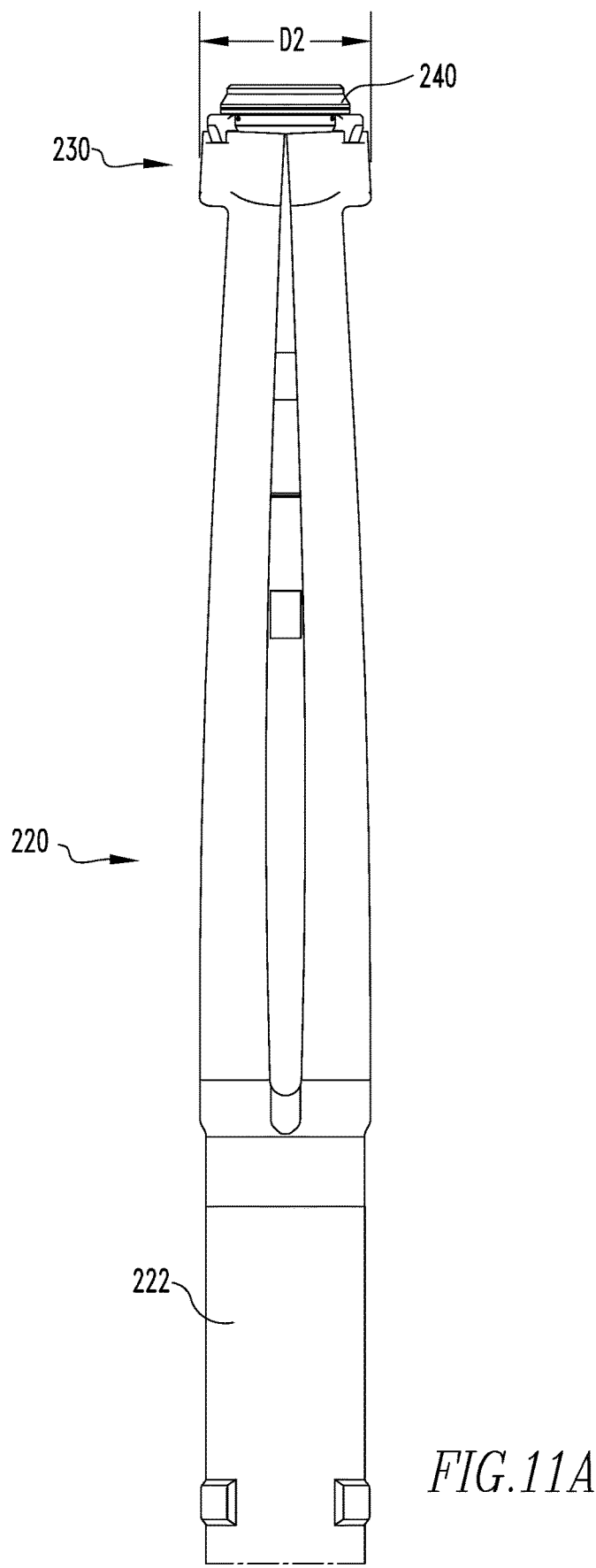
FIGS. 11A-11E are schematic views showing the thermal sleeve of FIGS. 9A and 9B along with example installation tooling in different stages of installation within a reactor head adaptor (shown sectionally)
Figure 11E:
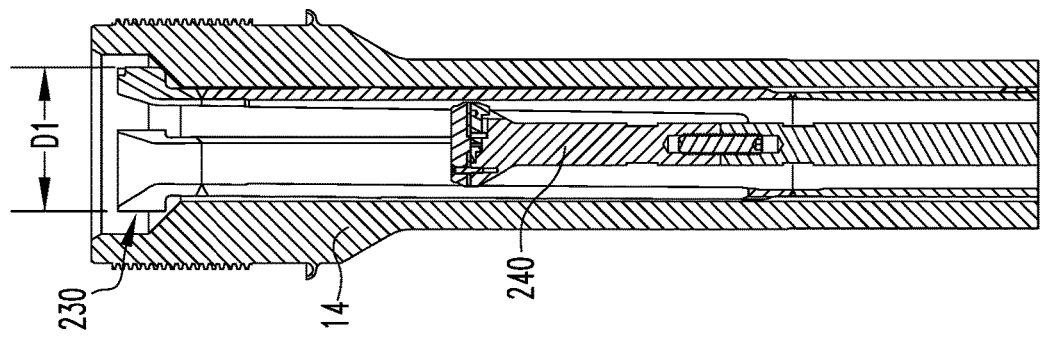
Figure 11D:
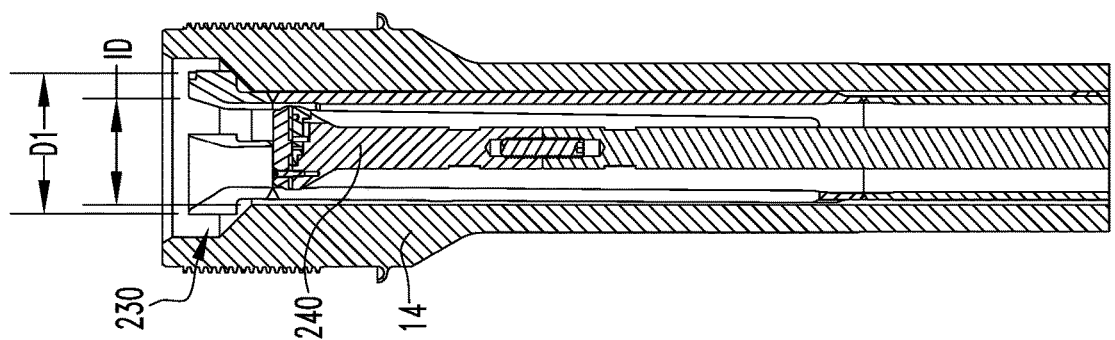
Figure 11C:
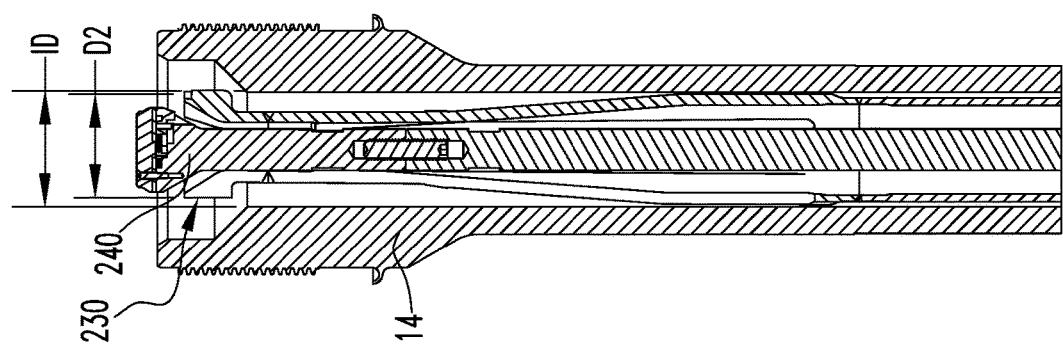
Figure 11B:
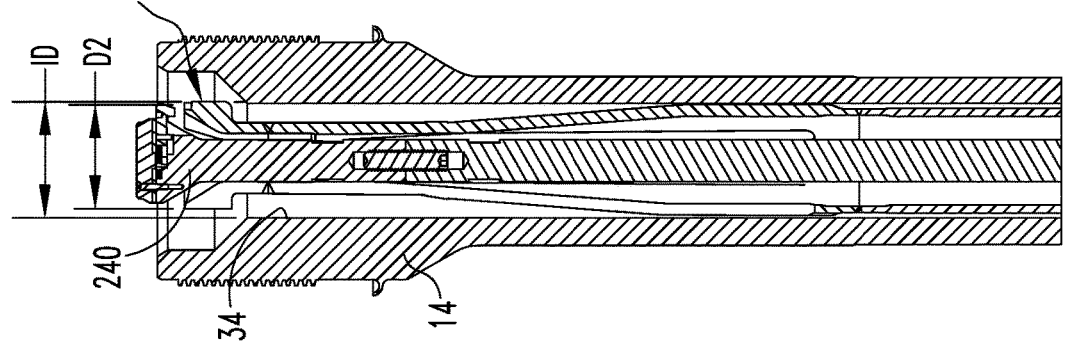
Figure 14A:
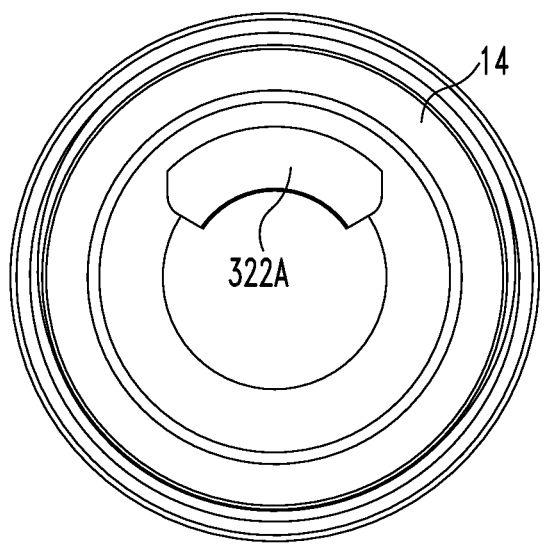
FIGS. 14A-F are axial views illustrating the steps in assembling the segmented leafs of the thermal sleeve of FIG. 12 in an adapter opening.
Figure 14B:
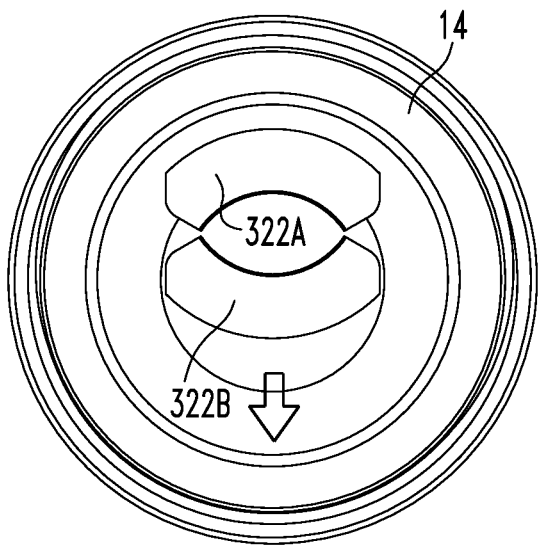
Figure 14C:
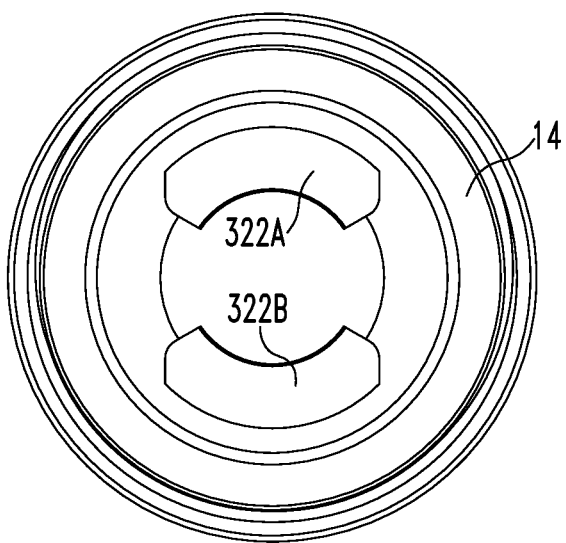
Figure 14D:
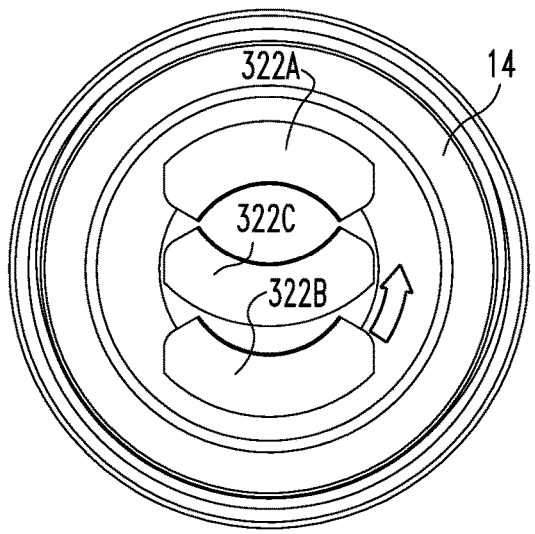
Figure 14E:
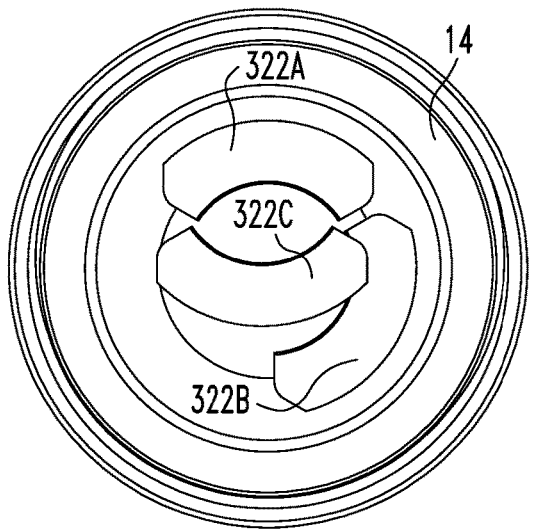
Figure 14F:
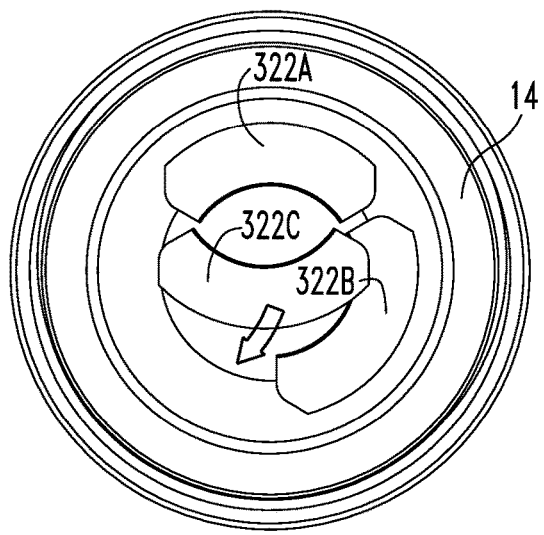
Figure 15:
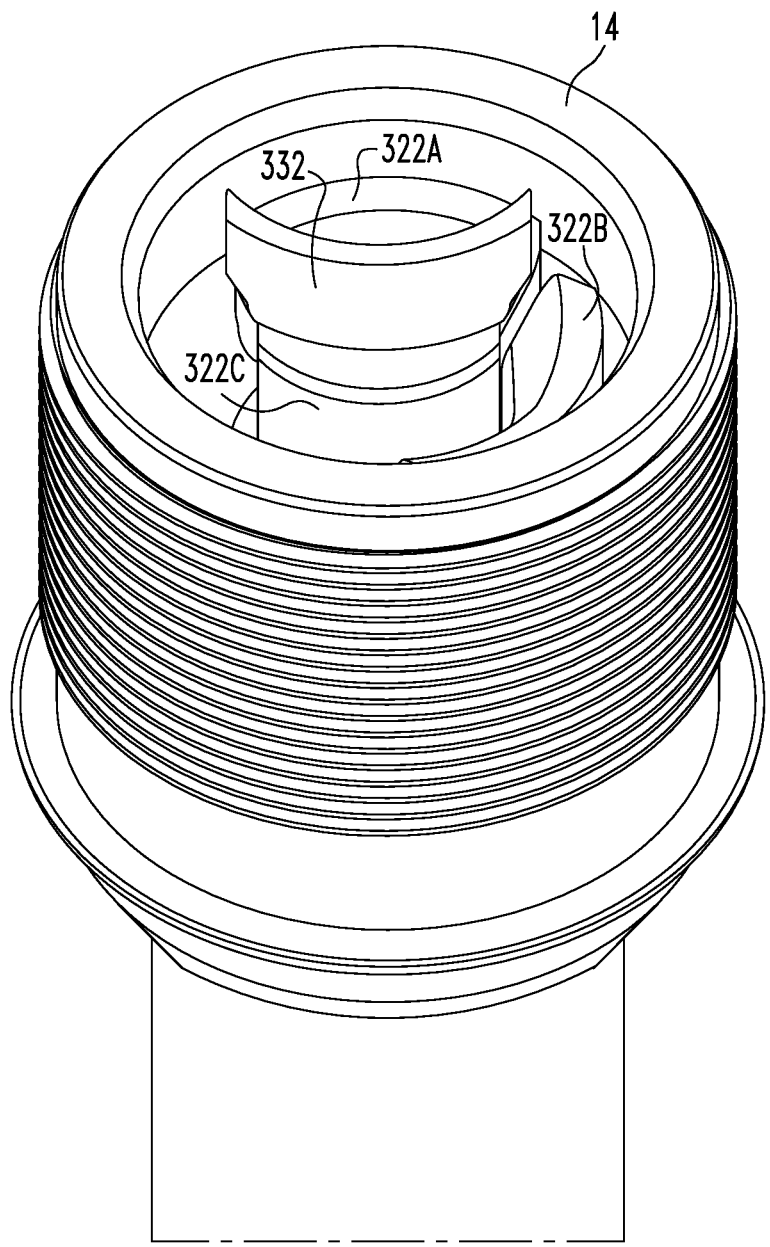
FIG. 15 is a perspective view further illustrating the arrangement of leafs of FIGS. 14E and 14F in the adapter opening.

Referring now to FIGS. 9A, 9B, 10A-10C, and 11A-11E, a compressible thermal sleeve 220 in accordance with another example embodiment of the present invention is shown. Thermal sleeve 220 is of generally similar design as thermal sleeve 20 (previously discussed) except thermal sleeve 220 further includes/utilizes a flanged region 230 which is expandable. By manufacturing thermal sleeve 220 with a flanged region 230 having an initially reduced outer diameter D2, a replacement sleeve 220 may be installed through the narrowest inner diameter ID of the opening 34 in head penetration adapter 14 (shown in section in FIG. 3, see also FIG. 1) through which thermal sleeve 220 it is to be inserted. Installation of thermal sleeve 220 relies on plastically deforming flange segments 233 radially outward. This process is figuratively illustrated in FIGS. 10A-10C and 11A-11E. Such plastic deformation is achieved through a tool 240 (FIGS. 11A-11E), such as a mandrel. Installation tooling 240 is initially inserted through sleeve 220 so as to be disposed above top end 228 to engage at the top of flanged region 230. Once thermal sleeve 220 has been inserted into head penetration adaptor 14 (with tooling 240 at the leading end of thermal sleeve 220), such as generally shown in FIG. 11B, tooling 240 is disengaged from thermal sleeve 220 and is pulled down through thermal sleeve 220 for removal, such as generally shown in FIGS. 11C-11E. During such removal, each of flanged segments are expanded (or swaged) such that they are plastically deformed to the larger outer diameter D1 which is greater than the inner diameter ID of head penetration adaptor 14.

Referring now to FIGS. 12-20, a thermal sleeve 320 in accordance with yet another example embodiment of the present invention is shown. Thermal sleeve 320 includes a tubular body 322 comprised of at least three separate leafs 322A, 322B, 322C which each extend axially (i.e., parallel to axis 324) from bottom end 380 to top end 328 of sleeve 320. More particularly, thermal sleeve 320 is sectioned into three leafs that respectively have a maximum width $W_{MAX}$ (FIG. 13) that is less than narrowest inner diameter ID of head penetration adapter 14. As discussed below, leafs 322A, 322B and 322C are secured to a spacing collar 382 via a nut 384.

Figure 16C:
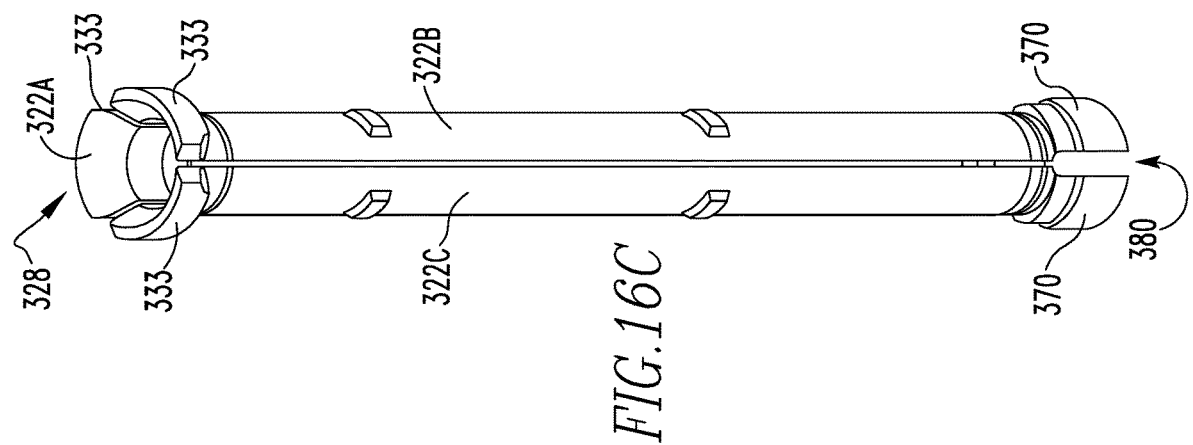
FIGS. 16A-C, respectively, show views of the segmented thermal sleeve of FIG. 12 in example assembled configurations.
Figure 16B:
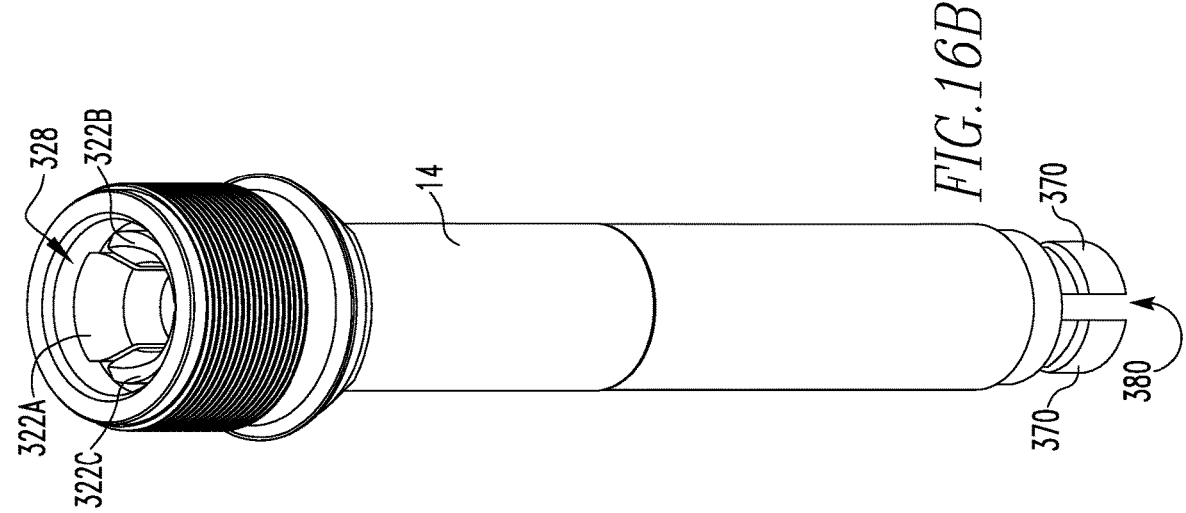
Figure 16A:
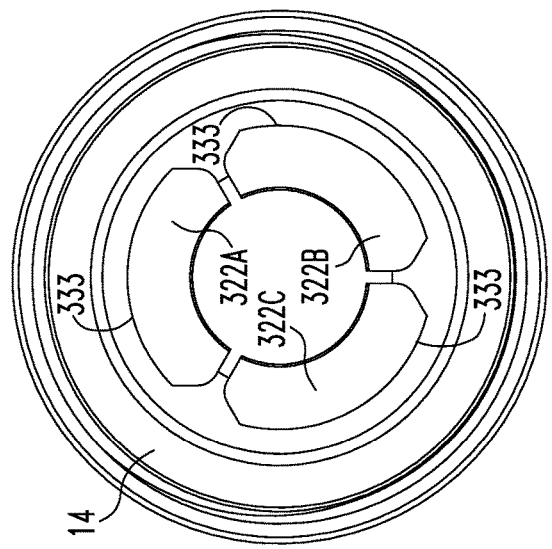
Figure 20:
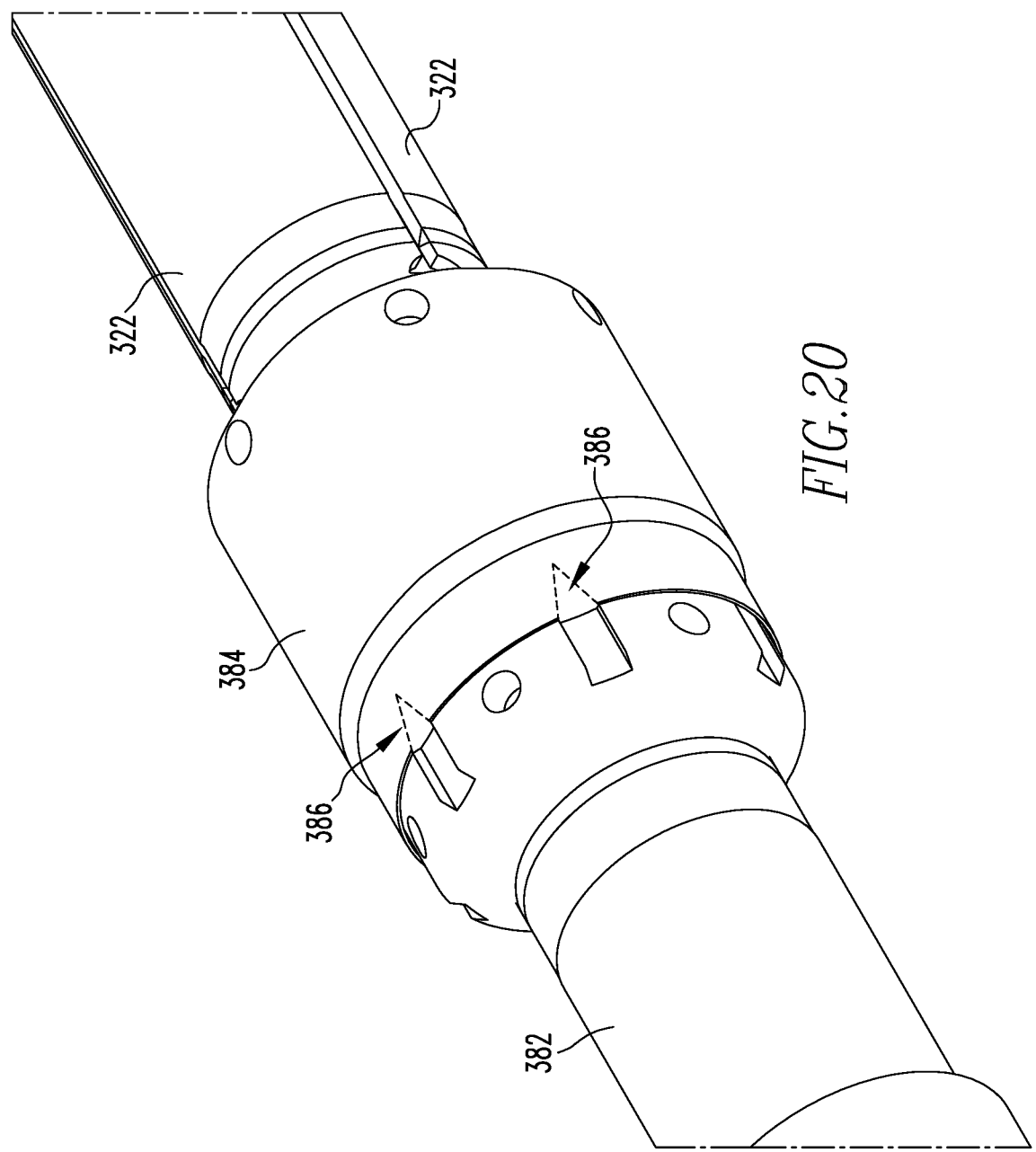
FIG. 20 is a perspective view illustrating the area over which the nut of FIG. 17B is crimped onto the collar of FIG. 17A.

Referring to FIG. 13, each leaf 322A, 322B, 322C is of similar construction and includes a flange lug 333 disposed at or about top end 328 and a tab 370 disposed at an opposite end 380. During assembly, each leaf 322A, 322B, 322C is first inserted through nut 384 which is slid part-way up leafs 322A, 322B, 322C so as to generally be out of the way. Next, each leaf 322A, 322B and 322C is inserted into head penetration adaptor 14 individually, and then arranged in a circular pattern underneath the reactor vessel head as described in detail in FIGS. 14A-14F, as well as FIG. 15, which illustrates how the at least one of leafs (e.g., 322C), must be generally elevated (i.e., protruded further into adaptor 14) such that the flange lug 333 thereof will clear the other two leafs (e.g., 322A and 322B) as they are moved into the finished circular/tubular arrangement such as shown in FIG. 16. After leafs 322A, 322B and 322C are arranged in the final arrangement shown in FIG. 16, spacing collar 382 (e.g., FIG. 17) is positioned generally radially within, and circumferentially between, tabs 370 of leafs 322A, 322B, 322C, such as shown in FIG. 18. The arrangement of tabs 370 and spacing collar 382 is then secured with a nut 384 which is slid down along the arrangement of leafs 322A, 322B, 322C and down around tabs 370 thereof and spacing collar 382 which generally forces each tab 370 toward spacing collar 382. Nut 384 is then threadingly engaged with spacing collar 382 and then crimped into place on spacing collar 382, such as shown generally at 386 in FIG. 20, to prevent disassembly of the combination of leafs 322A, 322B, 322C, spacing collar 382 and nut 384.

The current thermal sleeve replacement procedure can take as much as 6-8 weeks, in an emergency situation. Since such a repair would not be a planned outage activity, it would likely extend the plant outage critical path. Such an extension of a plant outage could cost millions of dollars in downtime. The anticipated time for the removal of the existing sleeve (or remnants) and installation of this replacement is on the order of a few days or less. The components of this invention are simple and relatively inexpensive to manufacture. They are very similar to the original thermal sleeve design, so the experience to manufacture them already exists.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof

What is claimed is:

1. A method of replacing a damaged thermal sleeve in a reactor vessel head adapter that connects a control rod drive mechanism to a reactor vessel head, the method comprising the steps of:
   accessing the damaged thermal sleeve from an underside of the reactor vessel head, wherein the damaged thermal sleeve is positioned in a tubular member comprising an opening located at the underside of the reactor vessel head;
   removing the damaged thermal sleeve;
   obtaining a replacement thermal sleeve having:
      an elongated tubular body disposed about a central longitudinal axis and extending between a bottom end and a top end;
      a flanged region disposed at or about the top end which extends radially outward from the elongated tubular body; and
      a plurality of slots defined in the elongated tubular body, each slot extending through and from the top end toward the bottom end along a predetermined distance, each slot having a width which is sufficient to narrow a maximum outside diameter of the flanged region from a first diameter to a second diameter in order to clear any obstruction in the opening of the tubular member in which the replacement thermal sleeve is to be inserted;
   altering the maximum outside diameter of the flanged region on the replacement thermal sleeve to an extent to clear any obstruction in the opening of the tubular member that will be encountered in inserting the replacement thermal sleeve to a location within the opening of the tubular member originally occupied by the damaged thermal sleeve, wherein the altering occurs prior to inserting the replacement thermal sleeve;
   inserting the replacement thermal sleeve into the opening of the tubular member from the underside of the reactor vessel head; and
   expanding the maximum outside diameter of the flanged region into a recess of the reactor vessel head adapter.

2. The method of claim 1, wherein altering the maximum outside diameter of the flanged region comprises exerting a compressive force to compress adjacent sections of the flanged region together; wherein expanding the maximum outside diameter of the flanged region comprises removing the compressive force.

3. The method of claim 1, wherein altering the maximum outside diameter of the flanged region and expanding the maximum outside diameter of the flanged region are performed by a tool inserted through the elongated tubular body of the replacement thermal sleeve that engages recesses or openings in an end surface of the elongated tubular body.

4. The method of claim 1, wherein altering the maximum outside diameter of the flanged region and expanding the maximum outside diameter of the flanged region are performed by tightening or releasing a retention strap installed below the flanged region.

5. The method of claim 1, wherein altering the maximum outside diameter of the flanged region is performed during manufacture of the replacement thermal sleeve and expanding the maximum outside diameter of the flanged region is performed from the underside of the reactor vessel head adapter.

6. A method of replacing a first thermal sleeve in a reactor vessel head adapter that connects a control rod drive mechanism to a reactor vessel head, the method comprising:
- accessing the first thermal sleeve from an underside of the reactor vessel head, wherein the first thermal sleeve is positioned in an elongate member comprising an opening located at the underside of the reactor vessel head;
- removing the first thermal sleeve;
- obtaining a second thermal sleeve, comprising:
  - an elongate body;
  - a plurality of flanges extending from the elongate body; and
  - a plurality of slots defined between the plurality of flanges, each slot having a width configured to allow an outside diameter of the plurality of flanges to narrow from a first diameter to a second diameter;
- narrowing the outside diameter of the plurality of flanges toward the second diameter;
- inserting the second thermal sleeve into the opening of the elongate member, wherein the narrowing occurs prior to inserting the second thermal sleeve into the opening of the elongate member; and
- expanding the outside diameter of the plurality of flanges toward the first diameter into a recess of the reactor vessel head adapter.

7. The method of claim 6, wherein narrowing the outside diameter of the plurality of flanges comprises exerting a compressive force to compress adjacent sections of the plurality of flanges together; wherein expanding the outside diameter of the plurality of flanges comprises removing the compressive force.

8. The method of claim 6, wherein narrowing the outside diameter of the plurality of flanges and expanding the outside diameter of the plurality of flanges are performed by a tool inserted through the elongate body of the second thermal sleeve that engages recesses or openings in an end surface of the elongate body.

9. The method of claim 6, wherein narrowing the outside diameter of the plurality of flanges and expanding the outside diameter of the plurality of flanges are performed by tightening or releasing a retention strap installed below the plurality of flanges.

10. The method of claim 6, wherein narrowing the outside diameter of the plurality of flanges is performed during manufacture of the second thermal sleeve and expanding the outside diameter of the plurality of flanges is performed from the underside of the reactor vessel head.

11. A method of replacing a damaged thermal sleeve in a reactor vessel head adapter that connects a control rod drive mechanism to a reactor vessel head, the method comprising:
- accessing the damaged thermal sleeve from an underside of the reactor vessel head, wherein the damaged thermal sleeve is positioned in a tubular member comprising an opening located at the underside of the reactor vessel head;
- removing the damaged thermal sleeve;
- obtaining a replacement thermal sleeve having:
  - an elongate tubular body disposed about a central longitudinal axis and extending between a bottom end and a top end;
  - a flanged region extending from the top end which extends radially outward from the elongate tubular body; and
  - a plurality of slots defined in the elongate tubular body, each slot extending a predetermined distance, each slot having a width which is sufficient to narrow an outside diameter of the flanged region from a first diameter to a second diameter;
- altering the outside diameter of the flanged region on the replacement thermal sleeve, wherein the altering occurs prior to replacing the damaged thermal sleeve with the replacement thermal sleeve;
- inserting the replacement thermal sleeve into the opening of the tubular member from the underside of the reactor vessel head; and
- expanding the outside diameter of the flanged region into a recess of the reactor vessel head adapter.

12. The method of claim 11, wherein altering the outside diameter of the flanged region comprises exerting a compressive force to compress adjacent sections of the flanged region together; wherein expanding the outside diameter of the flanged region comprises removing the compressive force.

13. The method of claim 11, wherein altering the outside diameter of the flanged region and expanding the outside diameter of the flanged region are performed by a tool inserted through the elongate tubular body of the replacement thermal sleeve that engages recesses or openings in an end surface of the elongate tubular body.

14. The method of claim 11, wherein altering the outside diameter of the flanged region and expanding the outside diameter of the flanged region are performed by tightening or releasing a retention strap installed below the flanged region.

15. The method of claim 11, wherein altering the outside diameter of the flanged region is performed during manufacture of the replacement thermal sleeve and expanding the outside diameter of the flanged region is performed from the underside of the reactor vessel head.

* * * * *